United States Patent
Harada et al.

(10) Patent No.: US 7,093,300 B1
(45) Date of Patent: Aug. 15, 2006

(54) ELECTRONIC APPARATUS HAVING SECURITY FUNCTION

(75) Inventors: Minoru Harada, Kobe (JP); Hiroyuki Watabe, Kobe (JP); Masaru Kamino, Rancho Palos Verdes, CA (US)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 09/360,142

(22) Filed: Jul. 26, 1999

(30) Foreign Application Priority Data

Jul. 27, 1998 (JP) ............................... P10-211533

(51) Int. Cl.
*G06F 1/26* (2006.01)
(52) U.S. Cl. .......................................... 726/34; 726/35
(58) Field of Classification Search ............. 340/568.1; 307/10.5; 726/35; 713/194, 182, 185; 380/34, 380/45
See application file for complete search history.

(56) References Cited

U.S. PATENT DOCUMENTS

| | | | | |
|---|---|---|---|---|
| 5,663,896 | A | * | 9/1997 | Aucsmith .................... 713/201 |
| 5,761,308 | A | * | 6/1998 | Torii et al. ..................... 705/52 |
| 5,973,411 | A | * | 10/1999 | Tado et al. ................. 307/10.5 |
| 6,087,937 | A | * | 7/2000 | McCarthy .................... 340/567 |
| 6,377,160 | B1 | * | 4/2002 | Groeger ....................... 340/5.6 |
| 6,421,782 | B1 | * | 7/2002 | Yanagisawa et al. ....... 713/201 |
| 2001/0011947 | A1 | * | 8/2001 | Jaber et al. .............. 340/568.1 |

FOREIGN PATENT DOCUMENTS

| | | |
|---|---|---|
| JP | 4-276849 | 10/1992 |
| JP | 8-175280 | 7/1996 |

OTHER PUBLICATIONS

Clark, A Survey of Authentication Protocol Literature, Nov. 17, 1997, Version 1.0 pp. 46, and 47.*
Schneier, Applied Cryptography, 1996, John Wiley, 2nd Edition, pp. 53-54.*

* cited by examiner

*Primary Examiner*—Hosuk Song
*Assistant Examiner*—Paula Klimach
(74) *Attorney, Agent, or Firm*—Wenderoth, Lind & Ponack, L.L.P.

(57) ABSTRACT

In the event that an electronic apparatus having a security function is forcibly put into an inoperable state because electric power is shut off once by an operation equivalent to theft, the inoperable state can be canceled by using a code notified by the dealer by telephone, without carrying the electronic apparatus in its dealer. After electric power is supplied again, the vehicle-mounted compact disc (abbreviated as CD) reproduction apparatus is used to play back a CD, and its TOC information is used as a judgment identification code C1. When the code C1 is identical to the authorized identification code A21, the electronic apparatus is made operable. In order to cancel the inoperable state after the number of inconsistencies becomes 10 or more, the individual code A22 of an EEPROM 21 is indicated and notified to the dealer. The dealer carries out calculation by using the individual code A22, and a result B2 of the calculation is notified to the user. The user inputs the calculation result B2. Individual code calculating means carries out the same calculation as the above-mentioned calculation and obtains the calculation result B3. When the calculation result B2 coincides with the calculation result B3, the inoperable state can be canceled.

13 Claims, 12 Drawing Sheets

ELECTRONIC APPARATUS HAVING SECURITY FUNCTION

BACKGROUND OF THE INVENTION

1. Field of the Invention

The present invention relates to an electronic apparatus having a security function for theft prevention.

2. Description of the Related Art

Examples of this kind of electronic apparatus are audio apparatuses, such as a compact disc reproduction apparatus, a radio receiver, a magnetic tape reproduction apparatus and a television set, mounted on vehicles, such as cars. This kind of electronic apparatus mounted on a vehicle is in danger of being removed from the vehicle and stolen. To prevent theft, a conventional electronic apparatus is configured such that when the electronic apparatus is reconnected to its power source, such as a battery, a predetermined identification code (abbreviated as ID) is required to be input. Only when the input identification code is the predetermined authorized code, the intrinsic operation of the electronic apparatus is carried out. When the authorized identification code is not input, the intrinsic operation of the electronic apparatus cannot be carried out.

Furthermore, to ensure this theft prevention, the number of times other wrong identification codes are input repeatedly while the authorized identification code is not input is counted by a counter. When the count value reaches a predetermined value or more, the electronic apparatus enters a dealer carry-in mode. In order to cancel the dealer carry-in mode so that the electronic apparatus can carry out its intrinsic operation, the electronic apparatus must be carried in to the dealer, where a master code must be input in the electronic apparatus. The master code has been determined commonly to every product of the electronic apparatus. For this reason, this master code is not disclosed to users, but strictly retained by the dealer. The dealer is herein a store or workshop for such electronic apparatuses, or for cars on which such electronic apparatuses are mounted.

The facts that the identification code is necessary to make this kind of electronic apparatus carry out its intrinsic operation, and that the master code is necessary in the dealer carry-in mode of the electronic apparatus should be known widely and generally by advertisement, whereby the electronic apparatus is not targeted for theft, and can be prevented from being stolen.

In the above-mentioned prior art, when the number of times unauthorized identification codes are input by the user reaches a predetermined value or more, the electronic apparatus enters the dealer carry-in mode, in spite of no theft. In the case of a configuration wherein the user inputs the identification code by using numeric keys, for example, the user may forget the identification code, whereby the apparatus enters the dealer carry-in mode. In the case of a configuration wherein a part of the content recorded on a compact disc to be read by the compact disc reproduction apparatus of the user is used as the identification code, when the compact disc of the user is damaged or lost, or when a wrong compact disc is played back a plurality of times, the apparatus enters the dealer carry-in mode. In these prior arts, the apparatus having entered the dealer carry-in mode as described above must be carried in the dealer.

In the prior arts, therefore, the electronic apparatus having entered the dealer carry-in mode must be carried in the dealer by the user. Furthermore, the dealer must cancel the dealer carry-in mode so that the electronic apparatus can perform its intrinsic operation. As a result, much effort and cost are required to cancel the dealer carry-in mode of the electronic apparatus in the case of the prior arts.

SUMMARY OF THE INVENTION

An object of the present invention is to provide an electronic apparatus having a security function, wherein, when the electronic apparatus falls into an inoperable state and cannot perform its intrinsic operation to attain security and prevent theft, the inoperable state can be canceled relatively easily.

Another object of the present invention is to provide a method of canceling the inoperable state of an electronic apparatus having a security function wherein the inoperable state of the electronic apparatus, caused to prevent theft, can be canceled at minimal effort and cost.

A still another object of the present invention is to provide a dealer-use calculation device for an electronic apparatus having a security function, wherein the inoperable state of the electronic apparatus, caused to prevent theft, can be canceled at minimal effort and cost.

The present invention provides an electronic apparatus having a security function, comprising: theft judging means for judging that the electronic apparatus has been exposed to theft; inoperable state setting means, in response to an output of the theft judging means, for, when the apparatus is judged as having been exposed to theft, putting the electronic apparatus into an inoperable state against theft in which a predetermined operation of a controlled circuit is disabled; a nonvolatile individual code memory M22 for storing an individual code A22 individually assigned to the electronic apparatus; output means for outputting an output code A221 having a predetermined first relationship with the individual code A22; input means for inputting an individual judgment code B2; individual code relationship judging means for judging whether the individual judgment code B2 input by the input means and the individual code A22 have a predetermined second relationship; and inoperable state canceling means for, when it is judged by the individual code relationship judging means that the individual judgment code B2 and the individual code A22 have the predetermined second relationship, canceling the inoperable state against theft of the controlled circuit.

Further, in the present invention, the electronic apparatus having a security function is characterized in that when the output code A221 and the individual judgment code B2 have a predetermined third relationship, the individual judgment code B2 and the individual code A22 have the predetermined second relationship.

According to the present invention, the electronic apparatus having a security function is mounted on a vehicle such as a car, and may be an audio apparatus such as a compact disc reproduction apparatus, a radio receiver, a magnetic tape reproduction apparatus or a television set, or may be another kind of electronic apparatus. The theft judging means judges that the electronic apparatus has been exposed to theft or an equivalent, and forcibly puts the controlled circuit of the electronic apparatus into the inoperable state against theft, that is, a second inoperable state which will be described later.

To cancel such an inoperable state against theft of the controlled circuit of the electronic apparatus, the individual code A22 individually assigned to the electronic apparatus and stored in the individual code memory M22 is used. The individual code A22 is calculated in accordance with a predetermined first relationship, so that the output code A221 is obtained. With regard to this first relationship: (a)

the value of the output code A221 may be the same as that of the individual code A22; (b) the individual code A22 may be subjected to calculation in accordance with a predetermined equation to obtain an output code A221 having a different value from that of the individual code A22; or (c) an output code A221 having a different value from that of the individual code A22 may be obtained in accordance with a preset table or the like. The output code A221 obtained in this way is output from the output means embodied by indication means or the like.

The output code A221 output from the output means is subjected to calculation in accordance with a predetermined third relationship, and the individual judgment code B2 is obtained from the calculation result. Such an output code A221 in accordance with the third relationship is obtained by calculation by a dealer-use calculation device provided for the dealer, for example.

The individual judgment code B2 is supplied to the individual code relationship judging means by the input means. The individual code relationship judging means judges whether the individual code A22 stored in the individual code memory M22 has a predetermined second relationship with the individual judgment code B2 input by the input means. The inoperable state canceling means cancels the inoperable state against theft of the controlled circuit of the electronic apparatus when the individual judgment code B2 and the individual code A22 have the second relationship. As a result, the electronic apparatus can carry out its usual intrinsic operation.

When the output code A221 having a first relationship with the individual code A22 have a third relationship with the individual judgment code B2, the individual judgment code B2 and the individual code A22 have a second relationship. As shown above, the first to third relationships are related to each other.

Furthermore, the present invention provides an electronic apparatus having a security function, comprising theft judging means for judging the electronic apparatus as having been exposed to theft or an equivalent; inoperable state setting means, in response to an output of the theft judging means for, when the apparatus is judged as having been exposed to theft, putting the electronic apparatus into an inoperable state in which a predetermined operation of a controlled circuit is disabled: a nonvolatile individual code memory M22 for storing an individual code A22 individually assigned to the electronic apparatus; indication means for reading the individual code A22 from the individual code memory M22 and indicating the code A22; input means for inputting an individual judgment code B2; individual code calculating means for carrying out predetermined individual code calculation by using the individual code A22; individual code relationship judging means for judging whether an individual judgment code B2 and a code B3 indicating the calculation result from the individual code calculating means have a predetermined individual judgment relationship; and inoperable state canceling means, in response to an output of the individual code relationship judging means for canceling an inoperable state when it is judged that the individual judgment code B2 and the code B3 indicating the calculation result from the individual code calculating means have the individual judgment relationship.

According to the present invention, the same as in the case of the condition judgement means, in the case where the theft judging means judges that the electronic apparatus has been exposed to theft or an equivalent to theft, the controlled circuit included in the electronic apparatus is forcibly put into an inoperable state similar to the above-mentioned second inoperable state. This inoperable state is canceled just as described above when it is judged by the individual code relationship judging means that the code B3 obtained by the calculation of the individual code calculating means by using the individual code A22 individually assigned to each product of the electronic apparatus and the individual judgment code B2 notified by the dealer to the user and input through the individual judgment code input means by the user have the predetermined individual judgment relationship, for example, when they are identical to each other.

The individual code A22 stored in the individual code memory M22 is indicated by the indication means. The individual code A22 indicated by the indication means is notified by the user to the dealer. The dealer carries out calculation similar to the predetermined individual code calculation carried out by the above-mentioned individual code calculating means, by using the individual code A22 notified by the user, and the calculation result B3 is then notified to the user. The user inputs the code B3 notified from the dealer, as the individual judgment code B2.

The indication means may be a visual indication means embodied by liquid crystal, a cathode ray tube or the like, or may be formed so as to carry out audio notification by outputting a voice signal generated by a voice synthesis circuit.

According to the present invention, as in a case where the electronic apparatus is stolen, when the electronic apparatus is removed from a vehicle with electric power being shut off from its power source such as a battery of the vehicle such as a car, the electronic apparatus is removed from the vehicle, the power source is connected again to supply electric power, and the authorized judgment identification code C1 is not input, the electronic apparatus is forcibly set to an inoperable state similar to the above-mentioned second inoperable state, whereby the security function is attained. The individual code A22 indicated by the indication means is notified by the user to the dealer, for example. The individual judgment code B2 obtained from the dealer is input by the user through the input operation of the individual judgment code input means. When the individual judgment code B2 input as described above and the code B3 obtained by calculation by using the individual code A22 stored in the individual code memory M22 of the electronic apparatus have the individual judgment relationship, for example, when they are identical to each other, the inoperable state of the electronic apparatus is canceled. Therefore, it is not necessary for the user to carry the electronic apparatus in the dealer to cancel the inoperable state of the electronic apparatus.

Furthermore, in the present invention, the indication means further indicates the intrinsic operation state of the controlled circuit, and the intrinsic operation of the controlled circuit is controlled by the output of the input means.

According to the present invention, the indication means and the input means are used for the intrinsic operation of the controlled circuit of the electronic apparatus. The indication means and the input means are also used to attain the security function for canceling the inoperable state. Therefore, it is not necessary to additionally provide any indication means and input means to ensure security for the electronic apparatus, whereby the configuration of the apparatus can be simplified. As a result, the electronic apparatus can be made compact according to the present invention. This is particularly important when the electronic apparatus is embodied in relation to an audio apparatus mounted on a vehicle, such as a car.

Furthermore, in the present invention, the electronic apparatus having a security function is characterized in that the individual code A22 is a production number A12 of the electronic apparatus.

Furthermore, in the present invention, the electronic apparatus having a security function further comprises: a nonvolatile unique memory M12 for storing data A12 unique to the electronic apparatus; and calculating means for carrying out a predetermined calculation by using the unique data A12 stored in the unique memory M12, and storing the calculation result B1 in the individual code memory M22 as the individual code A22.

According to the present invention, the individual code A22 stored in the individual code memory M22 may be the production number A12 of the electronic apparatus itself. On the other hand, in the case of another embodiment of the present invention, a predetermined calculation as shown in FIG. 12, mentioned later, may be carried out by using the production number A12 stored in the production number memory M12 to store the calculation result in the individual code memory M22 as the individual code A22.

Furthermore, in the present invention, the electronic apparatus having a security function is characterized in that the data A12 unique to the electronic apparatus is the production number.

According to the present invention, to calculate the individual code A22 to be stored in the individual code memory M22, the data A12 and A13 unique to the electronic apparatus are used. The data unique to the electronic apparatus may be, for example: (a) the above-mentioned production number A12 itself; (b) a fixed value A13 unique to the electronic apparatus previously stored in a memory area M13, as mentioned later, which is a value other than the production number; (c) both the production number A12 and the fixed value A13 as shown in FIG. 13, mentioned later; or (d) another data unique to the electronic apparatus.

Furthermore, the present invention further comprises: a nonvolatile production number memory M12 for storing the production number A12 of the electronic apparatus; and a production number calculating means for carrying out predetermined production number calculation by using the production number A12 stored in the production number memory M12, and for storing the calculation result B1 as the individual code A22 in the individual code memory M22.

According to the present invention, the electronic apparatus is provided with the production number memory M12 to determine an individual code A22 unique to each product of the electronic apparatus. The serial production number A12 of each product of the electronic apparatus is stored in the memory M12. The production number calculating means carries out the predetermined production number calculation by using the production number A12 stored in the production number memory M12. The calculation result B1 is used as the individual code A22.

According to the present invention, the production number A12 is obtained as the calculation result B1 by the predetermined production number calculation, and the calculation result B1 is used as the individual code A22. The production number A12 is thus not directly used as the individual code A22. This prevents the production number printed on the nameplate of the electronic apparatus, for example, from being directly used as the production number A12 for the predetermined individual code calculation by the thief. In addition, the individual code A22 can easily be assigned individually to the electronic apparatus.

According to the present invention, the individual code A22 assigned individually to each product of the electronic apparatus is obtained by carrying out the predetermined production number calculation by using the production number A12 of the electronic apparatus. Therefore, the individual code A22 can be set to a value unique to each product. Instead of directly using the production number A12 as the individual code A22, the production number A12 is subjected to the calculation to obtain the individual code A22. This configuration is thus more effective in theft prevention than the configuration wherein the production number A12 is directly used as the individual code A22. The predetermined production number calculation for obtaining the individual code A22 from the production number A12 can be attained by the production number calculating means embodied by a microcomputer. Therefore, it is not necessary to manually prepare a comparison table for the production number and the individual code A22, and it is possible to save effort for storing the comparison table in a nonvolatile memory. By storing the production number A12 in the nonvolatile production number memory M12, the individual code A22 can be obtained automatically by the calculation, whereby effort and cost can be reduced.

Furthermore, in the present invention, in response to the input of the individual judgment code B2 by the input means, the individual code A22 is updated by a predetermined calculation.

Furthermore, in the present invention, the individual code memory M22 is a writable memory, and the electronic apparatus further comprises writing means. The writing means, in response to the output of the individual code relationship judging means, when it is judged that the individual judgment code B2 from the individual judgment code input means and the code B3 for indicating the calculation result from the individual code calculating means have the predetermined individual judgment relationship, writes and updates the individual judgment code B2 from the individual judgment code input means or the calculation result B3 of the individual calculating means in the individual code memory M22 as a new individual code for the next calculation of the individual code calculating means.

According to the present invention, the individual judgment code B2 from the individual judgment code input means or the calculation result B3 of the individual code calculating means is sequentially updated and written as the individual code A22 in the individual code memory M22. A different individual code A22 is thus used each time the second inoperable state is canceled. Therefore, the individual code A22 unique to the electronic apparatus is changed each time the second inoperable state is canceled. For this reason, the individual code A22 used to cancel the previous inoperable state cannot be used again, whereby theft prevention can be enhanced more securely.

According to the present invention, each time the second inoperable state is canceled, the individual code A22 stored in the individual code memory M22 is updated by writing the calculation result B3 obtained by the individual code calculating means or the value identical thereto, that is, the calculation result B2 obtained by the dealer-use calculating means and notified by the dealer to the user. This further enhances the effect of theft prevention.

According to the present invention, when the user inputs the individual judgment code B2 in a wrong manner, and the individual code relationship means thereby judges that the wrong individual judgment code B21 input by the input means and the individual code A22 do not have a predetermined second relationship, the inoperable state canceling means do not cancel the inoperable state against theft. When such a wrong individual judgment code B21 is input and it is judged by the individual code relationship judging means that the second relationship is not established, the individual code A22 is rewritten and updated on the basis of the predetermined calculation. As a result, it is possible to enhance the security function furthermore.

Furthermore, in the present invention, the electronic apparatus having a security function is characterized in that, when an identification code A2 previously stored in a nonvolatile identification code memory M21 and a judgment identification code C1 input by the input operation of identification code input means have a predetermined judgment identification relationship, a predetermined operation of the controlled circuit is enabled, and when the identification code A21 stored in the identification code memory M21 and the input judgment identification code C1 do not have the judgment identification relationship, the electronic apparatus is put into an inoperable state for confirmation in which the predetermined operation of the controlled circuit is disabled. When a predetermined condition relating to the input operation of the identification code input means is established, the theft judging means judges that the electronic apparatus has been exposed to theft, and the inoperable state setting means do not enable the predetermined operation of the controlled circuit after the theft judging means judges that the electronic apparatus has been exposed to theft, regardless of the input operation of the identification code C1.

The present invention provides an electronic apparatus having a security function, wherein when an identification code A2 previously stored in a nonvolatile identification code memory M21 and a judgment identification code C1 input by the input operation of identification code input means have a predetermined identification judgment relationship, a predetermined operation of a controlled circuit is enabled, and when the identification code A2 stored in the identification code memory M21 and the input judgment identification code C1 do not have the identification judgment relationship, the electronic apparatus is put into a first inoperable state in which the predetermined operation of the controlled circuit is disabled. The apparatus comprises: condition judging means for judging whether a predetermined condition relating to the input operation of the identification code input means is established; inoperable state setting means, in response to an output of the condition judging means, for, when the condition is established, putting the electronic apparatus into a second inoperable state in which the predetermined operation of the controlled circuit is disabled, regardless of the input operation of the identification code C1 after the establishment of the condition; a nonvolatile individual code memory M22 for storing an individual code A22 individually assigned to the electronic apparatus, input means for inputting an individual judgement code B2; individual code calculating means for carrying out predetermined individual code calculation by using the individual code A22; individual code relationship judging means for judging whether the individual judgement code B2 and a code B3 indicating the calculation result from the individual code calculating means have a predetermined individual judgment relationship; and inoperable state canceling means, in response to an output of the individual code relationship judging means, for canceling the second inoperable state when it is judged that the individual judgment code B2 and the code B3 indicating the calculation result from the individual code calculating means have the predetermined individual judgment relationship.

According to the present invention, the electronic apparatus may be, for example, an audio apparatus, such as a compact disc reproduction apparatus, a radio receiver, a magnetic tape reproduction apparatus or a television set, mounted on a vehicle, such as a car, or may be another type of electronic apparatus. When a power source, such as a battery, is connected to the electronic apparatus and electric power is supplied thereto, or when electric power is supplied from a battery to some electric circuits constituting the electronic apparatus at all times, and electric power is supplied to the remaining circuits thereof by turning on an ignition switch for supplying electric power to the ignition circuit of the internal combustion engine of a car and by turning on the power switch of the apparatus, the user inputs the judgment identification code C1 by the input operation through the identification code input means. When this input judgment identification code C1 and the identification code A21 previously stored in the nonvolatile identification code memory M21 have the predetermined identification judgment relationship, for example, when the identification code A21 of the identification code memory M21 is identical to the input judgment identification code C1, the controlled circuit included in the electronic apparatus can carry out its predetermined operation. The controlled circuit is a compact disc reproduction means 11, a radio receiving means 13, a magnetic tape reproduction means 12 or a television receiving means of an electronic apparatus, for example. The expression "the controlled circuit can carry out the predetermined operation" means that the controlled circuit can carry out its intrinsic operation.

When the judgment identification code C1 input by the identification code input means and the identification code A21 previously stored in the identification code memory M21 do not have the predetermined identification judgment relationship, for example, when they are not identical to each other, the controlled circuit does not carry out the predetermined operation, and the electronic apparatus is forcibly set to the first inoperable state. In the electric apparatus controlled in this first inoperable state, when the input judgment identification code C1 and the identification code A21 of the identification code memory M21 have the predetermined identification judgment relationship, the first inoperable state is canceled, and the controlled circuit can carry out its predetermined operation as described above.

The condition judging means judges whether the predetermined condition relating to the input operation of the identification code input means is established. For example, when the judgment identification code C1 input by the input operation of the identification code input means and the identification code A21 of the identification code memory M21 do not have the identification judgment relationship, and when the judgment identification code C1 without the identification judgment relationship is input a predetermined number of times, for example, once or plural times, it is judged that the predetermined condition is established. This predetermined condition is the same as the condition obtained by the input operation of the identification code input means carried out in the event that the electronic apparatus is stolen. For this reason, the condition judging means may be theft judging means for judging that the electronic apparatus is stolen, or that the input operation of the identification code input means, equivalent to theft, is carried out.

When the predetermined condition is established, the inoperable state setting means sets the second inoperable state so that the controlled circuit does not carry out its predetermined operation. The predetermined operation of the controlled circuit in the above-mentioned first inoperable state may be identical to or different from the predetermined operation of the controlled circuit in the second inoperable state. Once the electronic apparatus is forcibly set to the second inoperable state, even when the judgment identification code C1 having the predetermined identification judgment relationship with the identification code A21 of the identification code memory M21 is input through the identification code input means, for example, the second inoperable state cannot be canceled, regardless of the input operation of the identification code C1. The second inoperable state of the present invention corresponds to the dealer carry-in mode described above in relation to the prior arts.

According to the present invention, the identification code A22 for theft prevention, unique to the electronic apparatus, is recorded in the nonvolatile individual code memory M22. When the predetermined condition is established such that the electronic apparatus has been exposed to theft or an equivalent, the individual judgment code B2 notified by the dealer to the user on the basis of the individual code A22 stored in the individual code memory M22 is input by the user through the individual judgment code input means, for example. When the individual judgment code B2 input as described above and the code B3 indicating the calculation result obtained by the predetermined individual code calculation of the individual code A22 in the electronic apparatus have the predetermined individual judgment relationship, for example, when they are identical to each other, the second inoperable state can be canceled. For this reason, the user is not required to carry the electronic apparatus in the dealer to cancel the second inoperable state of the electronic apparatus. This eliminates the need for effort and cost for carrying-in.

The present invention further comprises output means for reading the individual code A22 from the individual code memory M22 and outputting the code A22.

The output means of the present invention is indication means.

According to the present invention, the individual code A22 individually assigned to each product of the electronic apparatus is stored in the nonvolatile individual code memory M22 so as to be used to cancel the second inoperable state of the electronic apparatus controlled so as to be set at the second inoperable state. The stored individual code A22 undergoes the predetermined individual code calculation by the individual code calculating means provided in the electronic apparatus, and the code B3 indicating the result of the calculation is obtained.

The user of the electronic apparatus inputs the individual judgment code B2 unique to each product of the electronic apparatus owned by the user through the individual judgment code input means. In an embodiment described later, the individual judgment code B2 is obtained when the individual code A22 stored in the individual code memory M22 is read by the user through the output means, such as the indication means, and notified to the dealer, and then the dealer carries out the same calculation as the predetermined individual code calculation carried out through the individual code calculating means.

Although the output means may be the indication means, it may have a configuration wherein the individual code A22 stored in the individual code memory M22 is derived as an electrical signal and transferred to calculating means, such as a microcomputer or a personal computer, provided in the dealer. The calculating means of the dealer receives the signal from the output means and carries out the predetermined individual code calculation as described above.

In another embodiment of the present invention, the following may be enabled: the individual code A22 stored in the individual code memory M22 is read by using a microcomputer or a personal computer, for example; the individual code A22 having been read is supplied to the dealer; the dealer carries out the same calculation as the predetermined individual code calculation by using the individual judgment code A22; and the individual judgment code B2 obtained in this way is notified by the dealer to the user. When obtaining the individual judgment code B2 from the individual code A22 by calculation, the dealer may use calculating means, such as a microcomputer or a personal computer. The dealer may carry out the calculation manually, or another method may be used for the calculation. The predetermined individual code calculation method carried out by using the individual code calculating means and the predetermined individual code calculation method being similar thereto and carried out by the dealer as described above are disclosed to only the dealer and not disclosed to the user and others.

For example, when the individual code relationship judging means judges that the individual judgment code B2 notified by the dealer to the user as described above, and input through the individual judgment code input means and the code B3 indicating the calculation result of the individual code calculating means have the predetermined individual judgment relationship, for example, when they are identical to each other, the inoperable state canceling means cancels the above-mentioned second inoperable state, and the predetermined operation of the controlled circuit can be carried out.

The individual code A22 may be the calculation result B1 obtained by the predetermined production number calculation of the production number A12 unique to the electronic apparatus. In another embodiment of the present invention, the individual code A22 may be the production number A12 itself or another code.

The identification judgment relationship is not limited that the code A21 is identical to the code C1, and the individual judgment relationship is not limited that the code B2 is identical to the code B3. The codes may be values satisfying equations for predetermined calculations.

According to the present invention, the individual code A22 stored in the individual code memory M22 is notified to the dealer through the output means, for example. The dealer carries out the predetermined individual code calculation by using the individual code A22 as described above. The output means may output the individual code A22 in a state where the user can know, or may output the code A22 to the dealer or the like in a state where the user cannot know.

According to the present invention, the electronic apparatus further comprises the indication means as the output means. Therefore, the individual code A22 stored in the individual code memory M22 is indicated by the indication means, such as visual indication means or audio notification means, whereby the individual code A22 can be notified to the dealer easily, for example.

The present invention further comprises: a power shut-off detection means for detecting the shut-off state of electric power to the electronic apparatus; and a nonvolatile power shut-off memory, in response to an output of the power shut-off means, for writably storing the power shut-off state when power shut-off is detected, and the condition judging means comprises: count means for counting the number of times the judgement identification code C1 not having the identification judgment relationship is input through the identification code input means; and condition establishment judging means for judging that the predetermined condition is established when the power shut-off state is stored in the power shut-off memory and the count value is not less than a predetermined value N1, in response to the outputs of the power shut-off memory and the count means.

According to the present invention, when the electronic apparatus is removed from a car, for example, electric power supplied from the power source such as a battery to the electronic apparatus is shut off. This power shut-off is detected by the power shut-off detection means, and written in the nonvolatile power shut-off memory. Furthermore, the judgment identification code C1 is input by the input operation of the identification code input means to cancel the first inoperable state. When the input judgment identification code C1 and the identification code A21 previously stored in the identification code memory M21 do not have the identification judgment relationship, the number of inputs is counted by the count means. In the electronic apparatus which was exposed to theft, a power shut-off state is written in the power shut-off memory. When the stolen electronic apparatus is connected again to the power source, and the count value reaches the predetermined value N1 or more, it is judged that the predetermined condition is established. As a result, the controlled circuit of the electronic apparatus is controlled so as to be set to the second inoperable state. The predetermined value N1 may be 5 or 10.

According to the present invention, when electric power is shut off because the lines for supplying electric power between the battery and the electronic apparatus are broken or because the connector therebetween is disconnected in the event that the electronic apparatus is stolen, the power shut-off state is stored in the power shut-off memory. Furthermore, when the authorized judgment identification code C1 is not input through the identification code input means, even when input is attempted the predetermined N1 times or more, the predetermined condition is established. Therefore the electronic apparatus is judged as having been exposed to theft, and is forcibly put into the second inoperable state. In this way, the electronic apparatus is judged as having been exposed to theft, and theft prevention becomes effective. When the same operation as that judged that the predetermined condition is established and that theft is caused is conducted by the user, the electronic apparatus falls into the second inoperable state. This second inoperable state can be canceled as described above.

In addition, the present invention further comprises: a nonvolatile fixed value memory for storing a predetermined fixed value for calculation having plural digits, and the individual code calculating means is characterized in that every digit of a value having plural digits relating to the individual code A22 and every corresponding digit of the fixed value are subjected to logical calculation.

According to the present invention, the fixed value for calculation stored in the fixed value memory, not disclosed to the user and the like, is used for logic calculation when the predetermined individual code calculation is carried out by using the individual code calculating means to cancel the second inoperable state of the electronic apparatus. Therefore, the calculation procedure or calculation equation for obtaining the code B3 from the individual code A22 is far more prevented from being known by a third party. Theft prevention can thus be ensured more securely.

According to the present invention, a predetermined fixed value A13 for calculation having plural digits is used for the calculation for obtaining the code B3 having the identification judgment relationship with the individual judgment code B2. Since the fixed value for calculation is stored in the fixed value memory and not disclosed, the predetermined individual code calculation can be prevented from being known. The effect of theft prevention can thus be more enhanced.

Furthermore, in the present invention, the electronic apparatus having a security function is characterized in that the controlled circuit is an audio apparatus mounted on a vehicle.

Furthermore, the controlled circuit of the present invention is an audio apparatus mounted on a vehicle.

According to the present invention, the electronic apparatus including the controlled circuit to be set to the first and second inoperable states may be an audio apparatus, such as a compact disc reproduction apparatus, a radio receiver, a magnetic tape reproduction apparatus, a television set or the like. Since the electronic apparatus is mounted on a vehicle, such as a car, it has a relatively high possibility of being stolen. However, this invention can prevent the apparatus from being stolen.

According to the present invention, the present invention is applied to the audio apparatus mounted on a vehicle, such as a car. Therefore, the apparatus mounted on the vehicle, being prone to be stolen, can be prevented from being stolen.

Furthermore, the present invention provides a dealer-use calculation device, comprising deriving means for deriving the individual judgment code B2 having a predetermined third relationship with the output code A221 out of the output code A221 in the electronic apparatus having a security function.

According to the present invention, in the dealer-use calculation device, the deriving means derives the individual judgment code B2 having a predetermined first relationship by subjecting the output code A221 obtained from the output means of the electronic apparatus to calculation.

The present invention provides a dealer-use calculation device for canceling the inoperable state of an electronic apparatus having a security function. The electronic apparatus has such a security function that the predetermined operation of a controlled circuit is enabled when an identification code A21 previously stored in a nonvolatile identification code memory M21 and a judgment identification code C1 input by the input operation of identification code input means have a predetermined identification judgment relationship. The controlled circuit is controlled to enter a first inoperable state so as not to carry out the above-mentioned predetermined operation when the identification code A21 stored in the identification code memory M21 and the input judgment identification code C1 do not have the identification judgment relationship. The electronic apparatus comprises: condition judging means for judging whether a predetermined condition relating to the input operation of the identification code input means is established; inoperable state setting means, in response to an output of the condition judging means, for putting the electronic apparatus into a second inoperable state in which the predetermined operation of the controlled circuit is disabled when the condition is established, regardless of the input operation of the identification code C1 after the establishment of the condition: a nonvolatile individual code memory M22 for storing an individual cod A22 individually assigned to the electronic apparatus; first indication means for reading the individual code A22 from an individual code memory M22 and indicating the code A22: first input means for inputting an individual judgement code B2; individual code calculating means for carrying out predetermined individual code calculation by using the individual code A22; individual code relationship judging means for judging whether the individual judgment code B2 and a code B3 indicating the calculation result from the individual code calculating means have a predetermined individual judgment relationship; and inoperable state canceling means, in response to an output of the individual code relationship judging means, for canceling the second inoperable state when it is judged that the individual judgment code B2 and the code B3 indicating the calculation result from the individual code calculating means have the predetermined individual judgment relationship. The dealer-use calculation device comprises: second input means for inputting a dealer-use individual code; dealer-use calculating means for subjecting the dealer-use individual code from the second input means to the same calculation as the predetermined calculation of the individual code calculating means; and second indication means for indicating the calculation result of the dealer-use calculating means.

The present invention provides a dealer-use calculation device for canceling the inoperable state of an electronic apparatus having a security function, wherein the electronic apparatus comprises: theft judging means for judging that the electronic apparatus has been exposed to theft or an equivalent is carried out; inoperable state setting means, in response to the output of the theft judging means, for disabling a predetermined operation of a controlled circuit when the electronic apparatus is judged as having been exposed to theft: a nonvolatile individual code memory M22 for storing an individual code A22 individually assigned to the electronic apparatus; first indication means for reading the individual code A22 from the individual code memory M22 and indicating the code A22; first input means for inputting an individual judgment code B2; individual code calculating means for carrying out predetermined individual code calculation by using the individual code A22; individual code relationship judging means for judging whether an individual judgment code B2 and a code B3 indicating the calculation result from the individual code calculating means have a predetermined individual judgment relationship; and inoperable state canceling means, in response to the output of the individual code relationship judging means, for canceling an inoperable state when it is judged that the individual judgment code B2 and the code B3 indicating the calculation result from the individual code calculating means have the individual judgment relationship The dealer-use operation device comprises: second input means for inputting a dealer-use individual code; dealer-use calculating means for subjecting the dealer-use individual code from the second input means to the same calculation as the predetermined calculation of the individual code calculating means; and second indication means for indicating the calculation result of the dealer-use calculating means.

When the authorized user carried out an operation equivalent to theft, for example, and the electronic apparatus has fallen into the second inoperable state wherein its controlled circuit is made inoperable, this second inoperable state is notified to the dealer. At the dealer, the same calculation as the predetermined individual code calculation by the individual code calculating means provided for the electronic apparatus is carried out by using the dealer-use calculation device according to the present invention installed in a store for selling the electronic apparatus or in a workshop for repairing the apparatus. The calculation result of the dealer-use operation means, that is, the individual judgment code B2 for canceling the second inoperable state of the electronic apparatus, can be notified to the user.

According to the present invention, when the electronic apparatus is forcibly set to the second inoperable state wherein the controlled circuit thereof is made inoperable, the user can cancel the second inoperable state without carrying the electronic apparatus in the dealer, as described above.

According to the present invention, when the electronic apparatus having the security function has fallen into the second inoperable state, the individual judgment code B2 is notified by the dealer to the user by using the dealer-use calculation device that the dealer or the like owns. By using this code, the user can cancel the second inoperable state without carrying the electronic apparatus in the dealer.

Furthermore, the present invention provides a method of canceling an inoperable state of an electronic apparatus having a security function. The method comprises: preparing an electronic apparatus having a security function. The electronic apparatus comprises: theft judging means for judging the apparatus as having been exposed to theft; inoperable state setting means, in response to an output of the theft judging means, for, when the electronic apparatus is judged as having been exposed to theft, putting the electronic apparatus into an inoperable state against theft in which the predetermined operation of the controlled circuit is disabled; a nonvolatile individual code memory M22 for storing an individual code A22 individually assigned to the electronic apparatus; output means for outputting an output code A221 having a predetermined first relationship with the individual code A22; input means for inputting an individual judgment code B2; individual code relationship judging means for judging whether the individual judgment code B2 input by the input means and the individual code A22 have a predetermined second relationship; and inoperable state canceling means for, when it is judged by the individual code relationship judging means that the individual judgment code B2 and the individual code A22 have the predetermined second relationship canceling the inoperable state against theft of the controlled circuit, wherein the individual judgment code B2 and the individual code A22 have the predetermined second relationship when the output code A221 and the individual judgment code B2 have a predetermined third relationship. Preparing a dealer-use calculation device comprises deriving means for deriving the individual judgment code B2 having the predetermined third relationship with the output code A221 out of the supplied output code A221, wherein the output code A221 output from the output means of the electronic apparatus having a security function is supplied to the dealer-use calculation device, and the individual judgment code B2 derived in the dealer-use calculation device and having the predetermined third relationship with the output code A221 is input to the input means of the electronic apparatus having a security function.

According to the method of canceling the inoperable state of an electronic apparatus having a security function of the present invention, the output code A221 output from the output means of the electronic apparatus is supplied to the dealer-use calculation device, the individual judgment code B2 is thereby calculated and derived by the deriving means included in the dealer-use calculation device, and the individual judgment code B2 is input by the input means of the electronic apparatus and supplied to the individual code relationship judging means, so that the inoperable state against theft of the controlled circuit of the electronic apparatus can be canceled by the inoperable state canceling means.

Furthermore, in the method of canceling the inoperable state of the electronic apparatus having a security function, the electronic apparatus having a security function is characterized in that, when the identification code A21 previously stored in the nonvolatile identification code memory M21 and the judgment identification code C1 input by the input operation of the identification code input means have the predetermined judgment identification relationship, the predetermined operation of the controlled circuit is enabled, and when the identification code A2 stored in the identification code memory M21 and the input judgment identification code C1 do not have the judgment identification relationship, the electronic apparatus is put into an inoperable state for confirmation in which the predetermined operation of the controlled circuit is disabled. When a predetermined condition relating to the input operation of the identification code input means is established, the theft judging means judges that the electronic apparatus has been exposed to theft. Further, the inoperable state setting means do not enable the predetermined operation of the controlled circuit after the theft judging means judges the electronic apparatus as having been exposed to theft, regardless of the input operation of the identification code C1.

Furthermore, the present invention provides a method of canceling the inoperable state of an electronic apparatus, in which an electronic apparatus having a security function is prepared, in which the predetermined operation of a controlled circuit is enabled when an identification code A21 previously stored in a nonvolatile identification code memory M21 and a judgment identification code C1 input by the input operation of identification code input means have a predetermined identification judgment relationship, and the controlled circuit is controlled to enter a first inoperable state so as not to carry out the above-mentioned predetermined operation when the identification code A21 stored in the identification code memory M21 and the input judgment identification code C1 do not have the identification judgment relationship. The electronic apparatus comprises: condition judging means for judging whether a predetermined condition relating to the input operation of the identification code input means is established; inoperable state setting means, in response to an output of the condition judging means, for when the condition is established, putting the electronic apparatus into a second inoperable state in which the predetermined operation of the controlled circuit is disabled regardless of the input operation of the identification code C1 after the establishment of the condition; a nonvolatile individual code memory M22 for storing an individual cod A22 individually assigned to the electronic apparatus; first indication means for reading the individual code A22 from an individual code memory M22 and indicating the code A22; first input means for inputting an individual judgment code B2; individual code calculating means for carrying out predetermined individual code calculation by using the individual code A22; individual code relationship judging means for judging whether the individual judgment code B2 and a code B3 indicating the calculation result from the individual code calculating means have a predetermined individual judgment relationship; and inoperable state canceling means, in response to an output of the individual code relationship judging means, for canceling the second inoperable state when it is judged that the individual judgment code B2 and the code B3 indicating the calculation result from the individual code calculating means have the predetermined individual judgment relationship. Furthermore, a dealer-use calculation device is prepared. The dealer-use calculation device comprises: second input means for inputting a dealer-use individual code; dealer-use calculating means for subjecting the dealer-use individual code from the second input means to the same calculation as the predetermined calculation of the individual code calculating means; and second indication means for indicating the calculation result of the dealer-use calculating means. The method of canceling the inoperable state of an electronic apparatus is characterized in that; the individual code A22 indicated by the first indication means is input by the second input means; and the calculation result of the dealer-use calculating means, indicated by the second indication means, is input by the first input means.

Furthermore, the present invention provides a method of canceling the inoperable state of an electronic apparatus. The method comprises preparing an electronic apparatus having a security function and preparing a dealer-use calculation device. The preparing an electronic apparatus having a security function comprises: theft judging means for judging that the electronic apparatus has been exposed to theft or an equivalent; inoperable state setting means, in response to an output of the theft judging means, for putting the electronic apparatus into an inoperable state in which a predetermined operation of a controlled circuit is disabled when the electronic apparatus is judged as having been exposed to theft; a nonvolatile individual code memory M22 for storing an individual code A22 individually assigned to the electronic apparatus; first indication means for reading the individual code A22 from the individual code memory M22 and indicating the code A22; first input means for inputting an individual judgment code B2; individual code calculating means for carrying out predetermined individual code calculation by using the individual code A22; individual code relationship judging means for judging whether an individual judgment code B2 and a code B3 indicating the calculation result from the individual code calculating means have a predetermined individual judgment relationship; and inoperable state canceling means, in response to an output of the individual code relationship judging means, for canceling an inoperable state when it is judged that the individual judgment code B2 and the code B3 indicating the calculation result from the individual code calculating means have the individual judgment relationship. The preparing a dealer-use calculation device comprises: second input means for inputting a dealer-use individual code; dealer-use calculating means for subjecting the dealer-use individual code from the second input means to the same calculation as the predetermined calculation of the individual code calculating means; and second indication means for indicating the calculation result of the dealer-use calculating means. The individual code A22 indicated by the first indication means is input by the second input means, and the calculation result of the dealer-use calculating means, indicated by the second indication means, is input by the first input means.

According to the present invention, when the controlled circuit is forcibly set to the second inoperable state so as not to carry out its predetermined operation in the event that the electronic apparatus having the security function has been exposed to theft or an equivalent, the individual code A22 unique to the electronic apparatus and stored in the individual code memory M22 is read by the user and indicated on the first indication means to cancel the second inoperable state. The individual code A22 indicated on the first indication means is notified by the user to the dealer by telephone, for example. The individual code A22 notified by the user is input as a dealer-use individual code by the dealer through the second input means of the dealer-use calculating means. By using this code, the dealer-use calculating means carries out the same calculation as the predetermined individual code calculation carried out by the individual code calculating means provided for the electronic apparatus. The result of the calculation is indicated on the second indication means of the dealer-use calculation device. This calculation result indicated on the second indication means is notified by the dealer to the user by telephone, for example. The calculation result notified by the dealer and indicated on the second indication means is input as the individual judgment code B2 by the user through the first input means of the electronic apparatus. The individual code calculating means of the electronic apparatus carries out the predetermined individual code calculation by using the individual code A22 stored in the individual code memory M22 and indicated on the first indication means. The individual code relationship judging means judges whether the result of the calculation and the individual judgment code B2 input through the first input means have the predetermined individual judgment relationship, for example, whether they are identical to each other. When it is judged that the calculation result obtained by the individual code calculating means of the electronic apparatus and the individual judgment code B2 notified by the dealer and input through the first input means have the individual judgment relationship, the second inoperable state is canceled.

According to the present invention, the individual code A22 unique to the electronic apparatus and indicated on the first indication means is recognized by the user and notified to the dealer, for example. The individual judgment code B2 indicated on the second indication means is recognized by the dealer and notified to the user. The individual judgment code B2 is input by the user through the first input means. As a result, the second inoperable state of the electronic apparatus is canceled. As described above, the calculation by using the dealer-use calculation device provided for the dealer and the like must be carried out once to cancel the second inoperable state of the electronic apparatus. This makes it possible to prevent theft, that is, the electronic apparatus can be prevented from being stolen.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
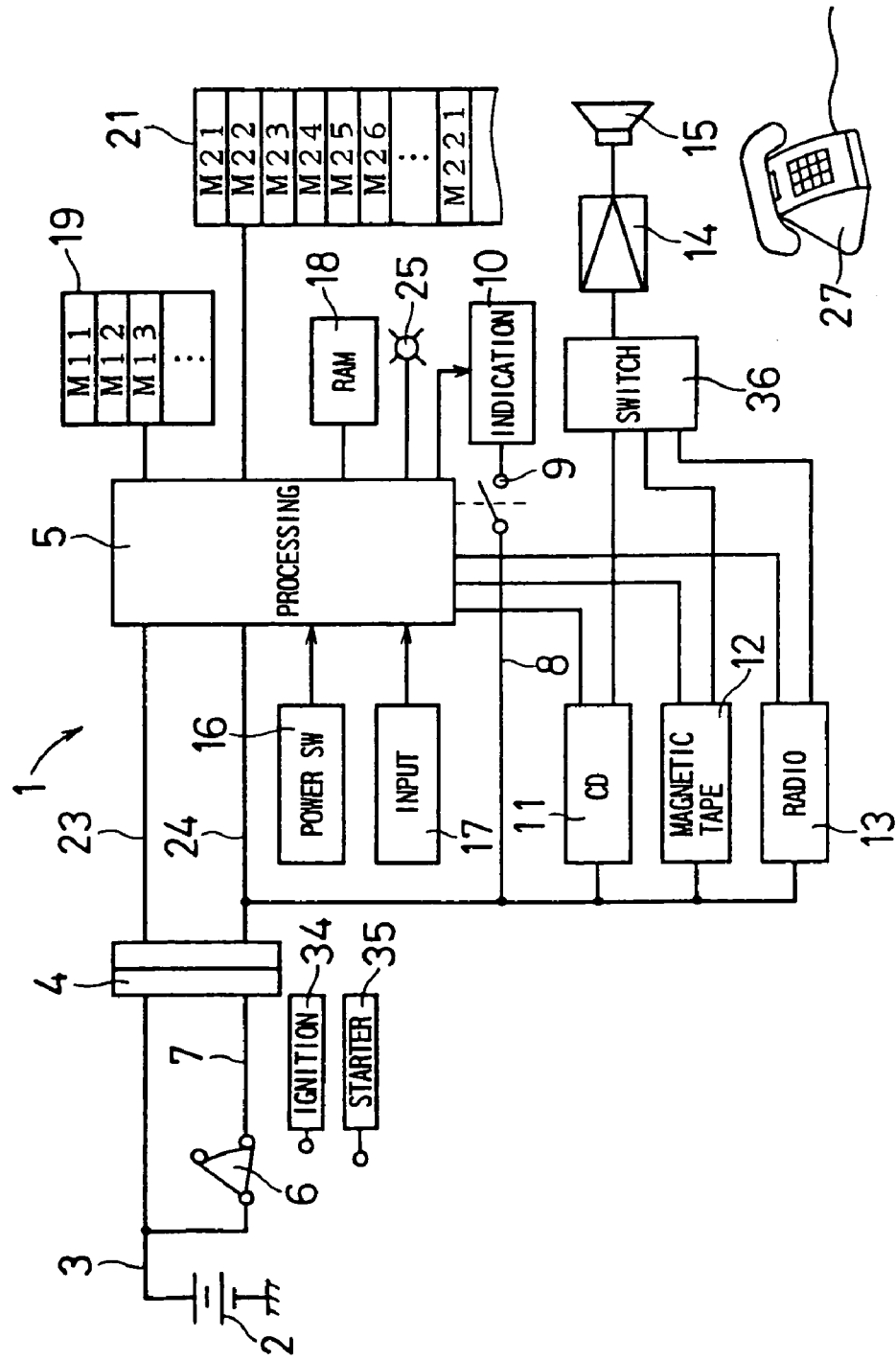
FIG. 1 is a block diagram showing the configuration of a vehicle-mounted audio apparatus 1 in accordance with an embodiment of the present invention.

Now referring to the drawings, preferred embodiments of the invention are described below.

FIG. 1 is a block diagram showing the configuration of a vehicle-mounted audio apparatus 1 in accordance with an embodiment of the present invention. This audio apparatus 1 is mounted on a vehicle, such as a car. Electric power from a power source 2, such as a battery, is supplied to a processing circuit embodied by a microcomputer or the like from a line 3 via a disconnectable connector 4, and also supplied to the processing circuit 5 from an ignition switch 6 via a line 7, the connector 4 and lines 23, 24. Furthermore, the electric power supplied from the line 7 via the connector 4 is supplied to an indication means from a line 8 via a switch 9, and also supplied to a compact disc (abbreviated as CD) reproduction means 11, a magnetic tape reproduction means 12 and a radio/television set 13. Audio signals from these means 11, 12 and 13 are amplified by an amplifier circuit 14 to drive a speaker 15 via a switching means 36.

Figure 2:
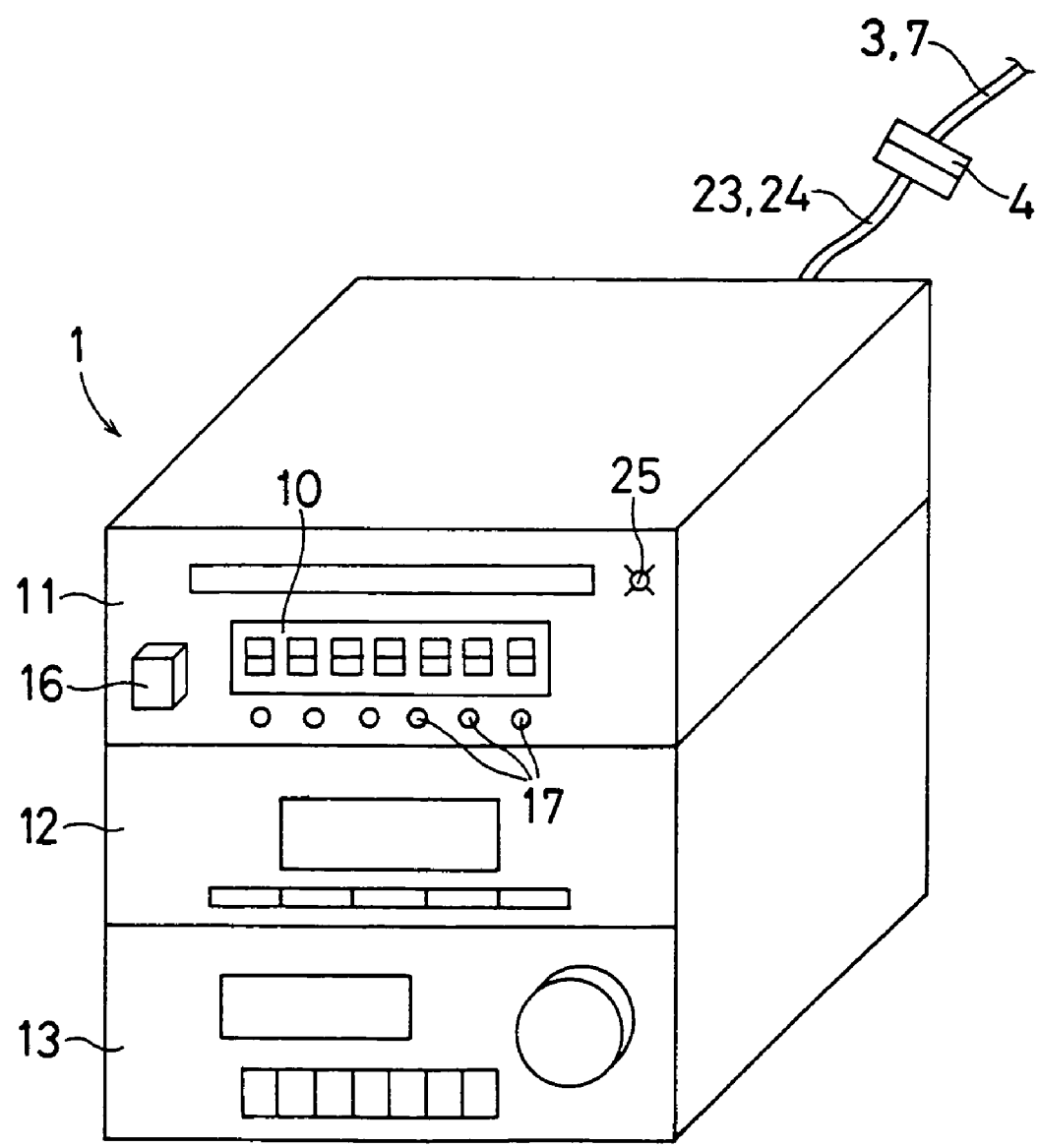
FIG. 2 is a simplified external perspective view showing the audio apparatus 1.

FIG. 2 is a simplified external perspective view showing the audio apparatus 1. In this embodiment, the indication means 10 is used to indicate the operation information of the compact disc reproduction means 11 and the contents recorded on a compact disc, and is also used to indicate operation related to a security function in accordance with the present invention. A power switch 16 is connected to the processing circuit 5. By pressing the power switch 16 to turn it on while electric power is supplied to the audio apparatus 1 via the ignition switch 6, the switch 9 is brought into conduction, and the audio apparatus 1 enters its operation state. The operation state of the audio apparatus 1 can be stopped by pressing the power switch 16 to turn it off. The ignition switch 6 supplies/shuts off the electric power of the power source 2 to the ignition circuit 34 and the starter motor 35 of the internal combustion engine, such as the spark-ignition internal combustion engine of a vehicle. An input means 17 is used to control the intrinsic compact disc reproduction operation of the compact disc reproduction means 11, and is also used to control the security function in accordance with the present invention.

Furthermore, a random-access memory RAM 18 for calculation is connected to the processing circuit 5.

A non-erasable nonvolatile read-only memory 19 and a writable nonvolatile memory 21 are also connected to the processing circuit 5. The memory 21 is an EEPROM (Electrically Erasable Programmable Read Only Memory). The contents stored in the memories 19, 21 are retained even when electric power from the power source 2 is shut off. A master code A11 is stored in the memory area M11 of the memory 19. A unique production number A12 assigned to each product of the audio apparatus 1 is stored in the memory area M12. A fixed value A13 for carrying out a predetermined individual code calculation described later is stored in the memory area M13.

An identification (abbreviated as ID) code A21 is stored in the memory area M21 of the memory 21. This identification code A21 is TOC (Table Of Contents) information stored in the lead-in area of a compact disc selected by the user and reproduced by the compact disc reproduction means 11. An individual code A22 is stored in the memory area M22. This individual code A22 can be updated and written. An individual judgment code B2 input through the input means 17 is rewritably stored in the memory area M23. A code B3 indicating the result of the predetermined individual code calculation described later is stored in the memory area M24. Furthermore, data A25 indicating the fact that the disconnectable connector 4 is disconnected once and electric power to the audio apparatus 1 is shut off is stored in the memory area M25. Data A26 indicating the fact that the audio apparatus 1 has fallen into a second inoperable state described later is stored in the memory area M26.

Figure 3:
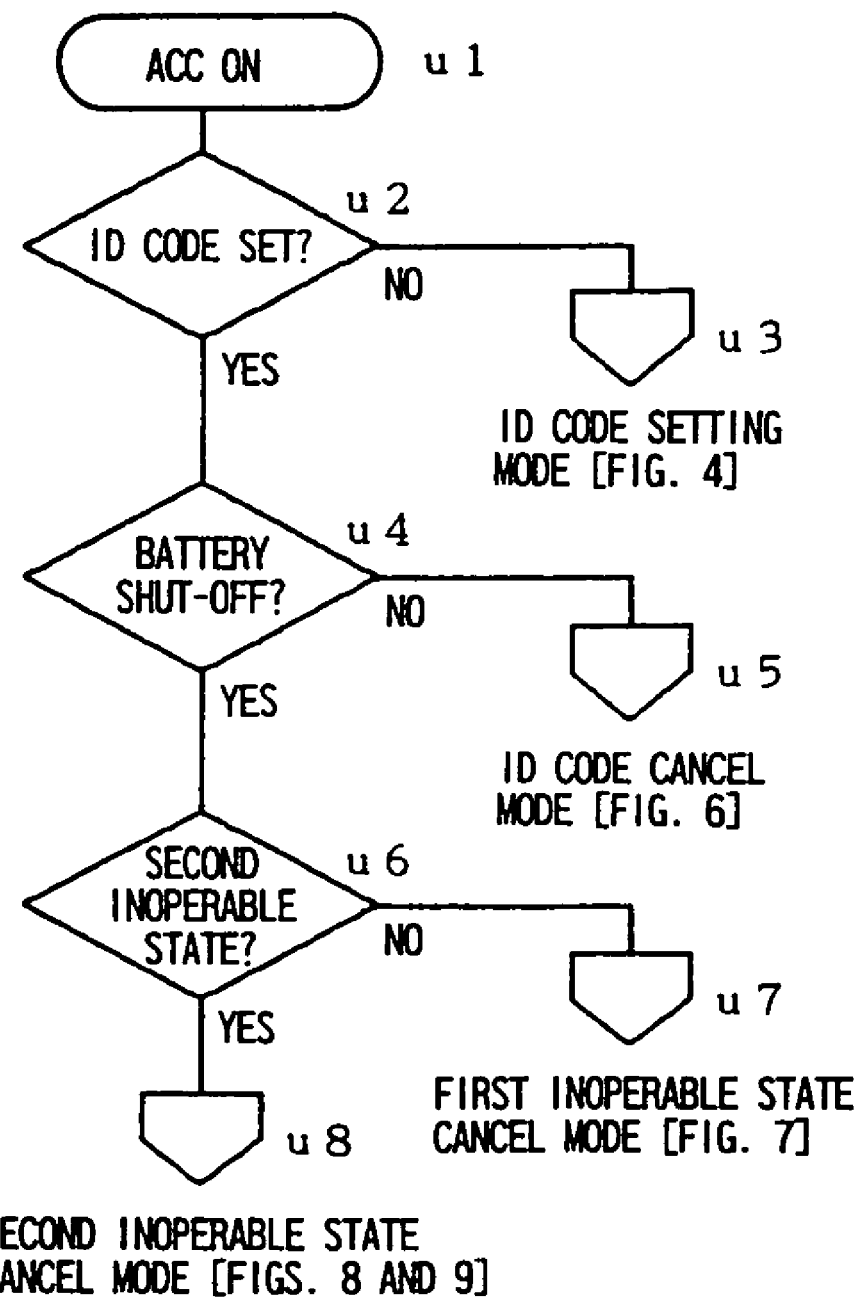
FIG. 3 is a flowchart showing the main routine of the operation carried out by a processing circuit 5.

FIG. 3 is a flowchart showing the main routine of the operation carried out by the processing circuit 5. At step u1, the state of the connector 4 is changed from a disconnection state to a connection state. When the power switch 16 is turned on, and the audio apparatus 1 enters an operation state, the operations after step u2 will start as shown in FIG. 3. At step u2, a judgment is made to determine whether the identification code A21 is set and stored in the memory area M21 of the memory 21. When the identification code A21 is not set, the procedure of the routine advances to step u3, and enters an identification code setting mode.

When it is judged at step u2 that the identification code A21 is set, the procedure advances to the next step u4. At step u4, a judgment is made to determine whether the data A25 indicating that the power source is shut off once because of the disconnection of the connector 4 for connecting the audio apparatus 1 to the power source 2 or the break of the line 3 is stored in the memory area M25. When the data indicating power shut-off is not stored in the memory area M25, the procedure enters an identification code cancel mode at the next step u5. When the data A26 indicating power shut-off is stored in the memory area M25, the audio apparatus 1 has fallen into a first or second inoperable state. The procedure advances to step u6, and a judgment is made to determine whether data indicating the second inoperable state is stored in the memory area M26. When it is judged at step u6 that the data indicating the second inoperable state is not stored, it is indicated that the audio apparatus 1 is in the first inoperable state. The procedure then advances to step u7 and enters the mode for canceling this first inoperable state.

The first inoperable state is also referred to as an inoperable state for confirmation, and the second inoperable state is also referred to as an inoperable state against theft. These first and second inoperable states may be identical to or different from each other.

The processing circuit 5 always monitors the voltage on the line 23 directly connected to the power source 2. When the monitored voltage drops below a predetermined value, it is judged that power shut-off is caused. Data indicating this power shut-off is stored in the memory area M25.

When data indicating the second inoperable state is stored in the memory area M26, the procedure advances to step u8 and enters the mode for canceling the second inoperable state.

Figure 4:
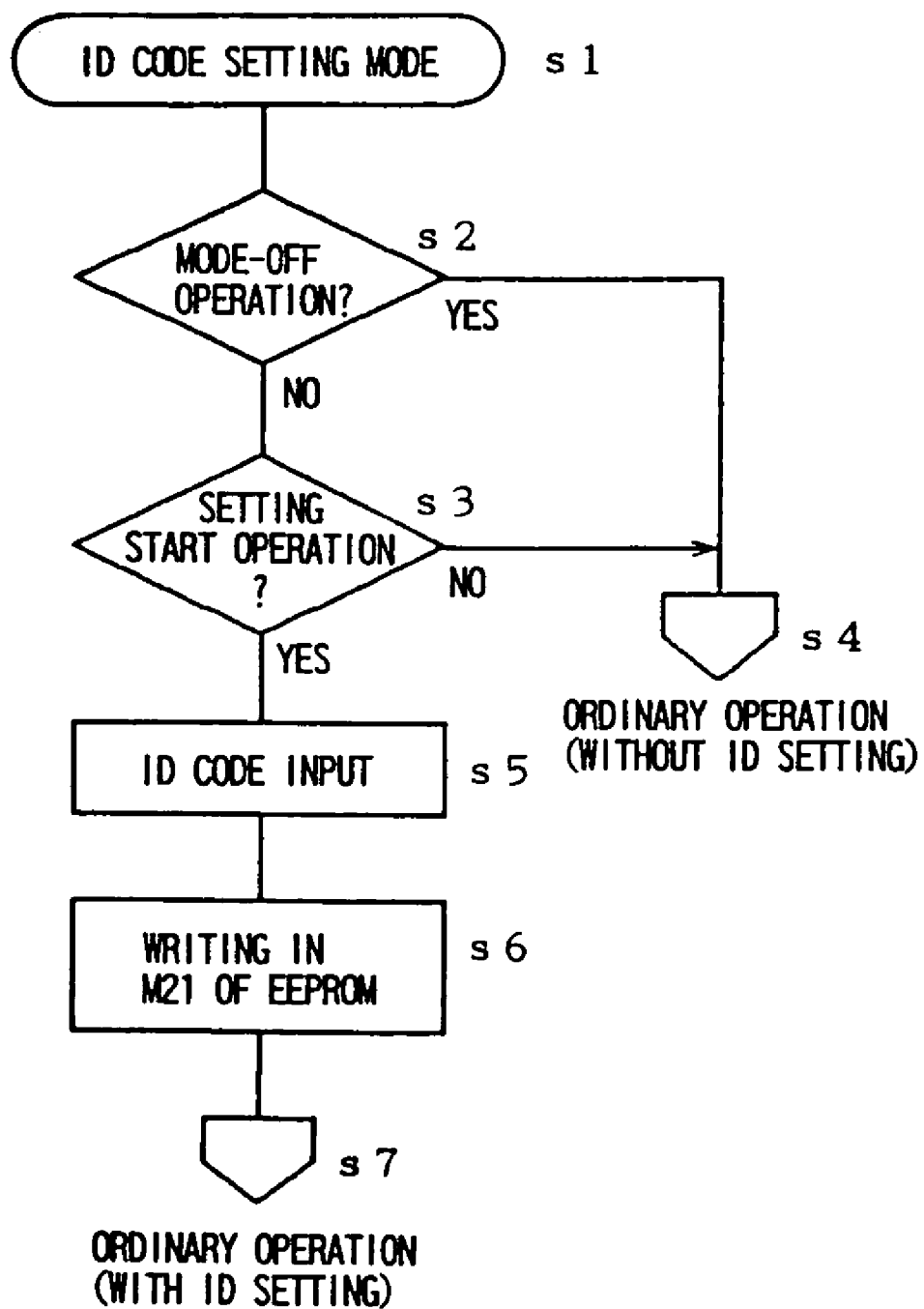
FIG. 4 is a flowchart illustrating the operation carried out by the processing circuit 5 in the identification code setting mode at step u3 of FIG. 3.

FIG. 4 is a flowchart illustrating the operation carried out by the processing circuit 5 in the identification code setting mode at step u3 of FIG. 3. The identification code is sometimes referred to as an ID (identification) code. The procedure advances from step s1 to step s2, and a judgment is made to determine whether a mode-off operation has been carried out. When the mode-off operation has been carried out, the procedure advances to step s4. At this step, the ordinary operation processing for the intrinsic operation control of the audio apparatus 1 is carried out, without setting the identification code A21 into the memory area M21 of the memory 21. The mode-off operation is an operation other than the ID code setting start operation, and is the ordinary operation of the audio apparatus 1, such as insertion/ejection of a compact disc, selection of a song, control of volume and tone and the like.

At step s3, a judgment is made to determine whether an identification code setting start operation has been carried out. When the operation has been carried out, the procedure advances to step s5. The identification code setting start operation is a predetermined specific operation. In the case of the embodiment of the present invention, the operation is an operation other than the ordinary operation for reproduction of a compact disc, for example, and may be the simultaneous operation of a switch for inserting/ejecting a compact disc and a switch for selecting a first song. At step s5, the compact disc previously selected and inserted by the user is reproduced by the compact disc reproduction means 11. The TOC (table of contents) information stored in its lead-in area is written and stored as the identification data A21 in the memory area M21 at the next step s6. At step s7, the ordinary operation of the audio apparatus 1 is carried out.

Figure 5:
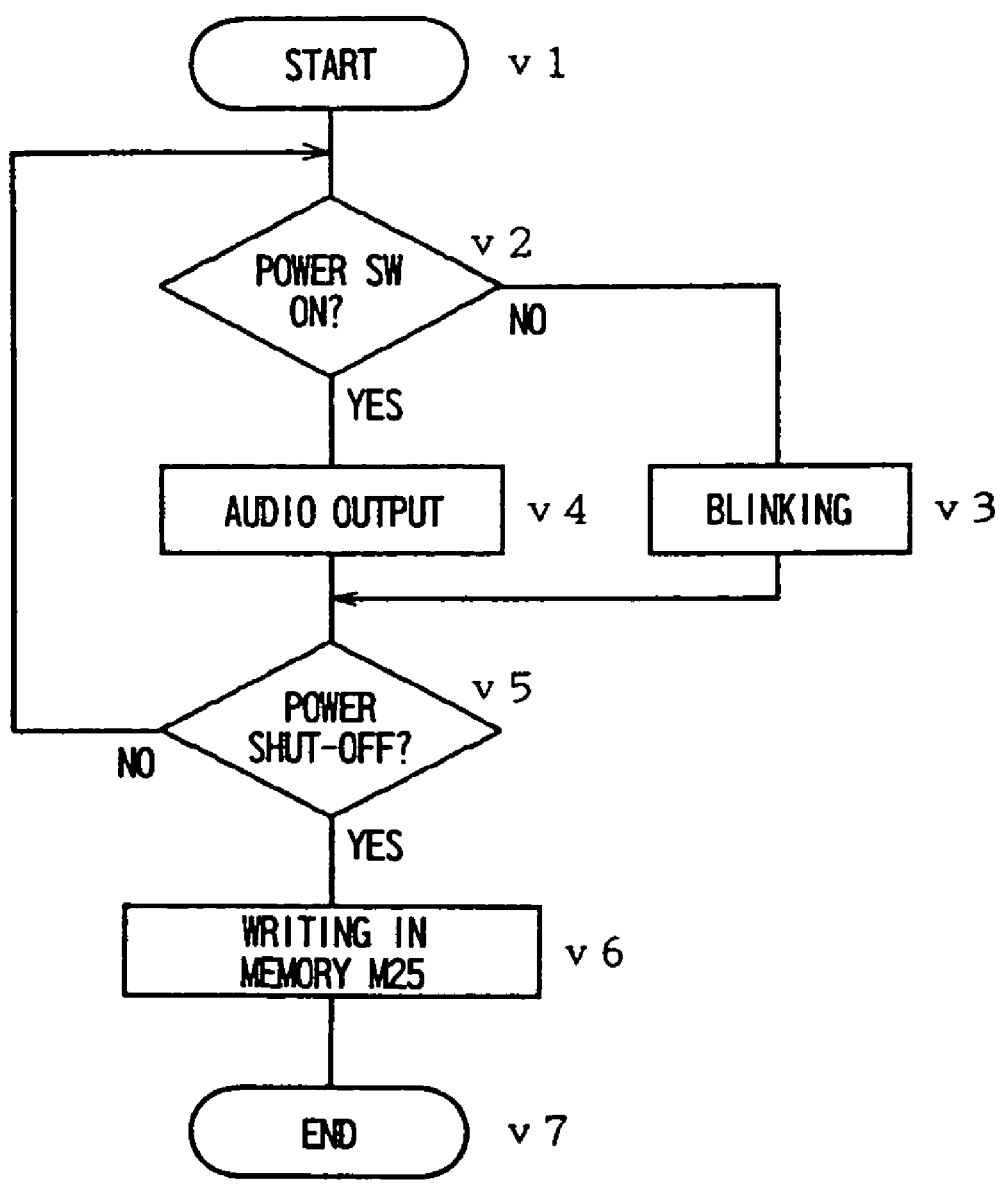
FIG. 5 is a flowchart illustrating a part of the operation carried out by the processing circuit 5.

FIG. 5 is a flowchart illustrating a part of the operation carried out by the processing circuit 5. The procedure advances from step v1 to step v2. In a state wherein the connector 4 is connected, the ignition switch 6 is turned on, and electric power is supplied to the processing circuit 5 via the lines 23, 24, a judgment is made at step v2 to determine whether the power switch 16 has been pressed and turned on. When the power switch 16 has not been turned on, a lamp 25 blinks at step v3. While the audio apparatus 1 does not perform audio operation, that is, while the power switch 16 is turned off, the lamp 25 blinks. By seeing this blinking of the lamp 25, the thief understands that the audio apparatus 1 has a security function. This prevents the audio apparatus from being stolen.

Figure 6:
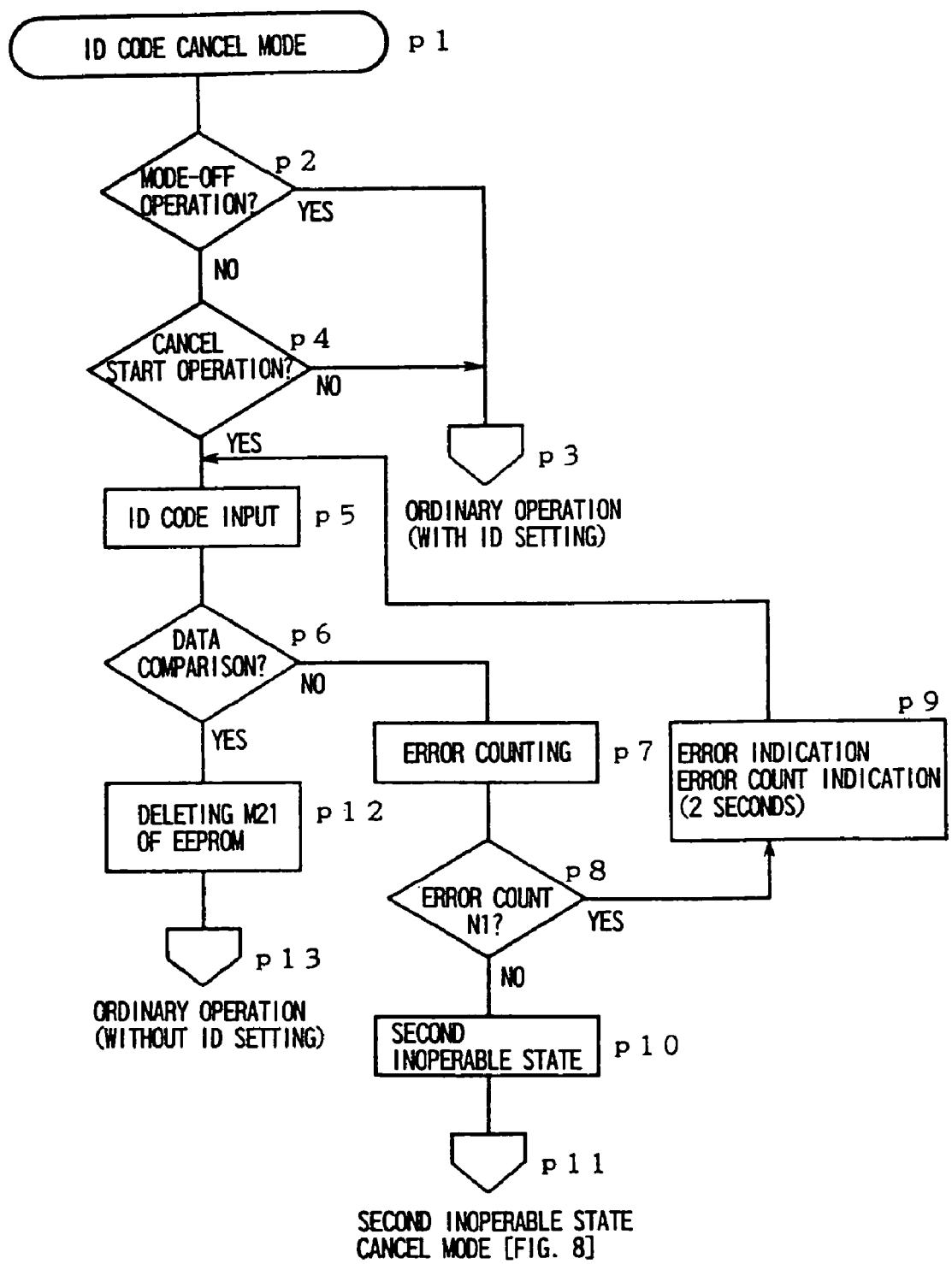
FIG. 6 is a flowchart illustrating the operation carried out by the processing circuit 5 in the identification code cancel mode shown in FIG. 3.

When it is judged at step v2 that the power switch 16 has been turned on, it is judged at the above-described step u4 of FIG. 3 that the data A25 indicating the power shut-off is not stored in the memory area M25, that is, the apparatus does not fall into the first inoperable state, and it is judged at step u6 of FIG. 3 that the data A26 indicating the second inoperable state is not stored in the memory area M26, the procedure advances to step v4 in accordance with step s4 of FIG. 4 and step p3 of FIG. 6, whereby the audio apparatus 1 performs its intrinsic ordinary operation, and generates audio output.

FIG. 6 is a flowchart illustrating the operation carried out by the processing circuit 5 in the identification code cancel mode shown in FIG. 3. The procedure advances from step p1 to step p2, and a judgment is made to determine whether the mode-off operation has been carried out. When the mode-off operation has been carried out, the procedure advances to step p3. At this step, the ordinary operation processing for the intrinsic operation control of the audio apparatus 1 is carried out. When the mode-off operation has not been carried out at step p2, a judgment is made at step p4 to determine whether ID code cancel start operation has been carried out. When the operation has not been carried out, the procedure advances to step p3. The mode-off operation at step p2 is an ordinary operation explained with respect to step s2 described above referring to FIG. 4. The identification code cancel start operation at step p4 is a predetermined specific operation. In the case of the embodiment of the present invention, the operation may be the simultaneous operation of the compact disc insertion/ejection switch and a switch for selecting a second song from among plural songs recorded on the compact disc inserted. As described above, this operation is an operation other than the ordinary operation of the audio apparatus 1.

At step p5, a judgment identification code C1 is input. This judgment identification code C1 is TOC information stored in the lead-in area of a compact disc read by the compact disc reproduction means 11. The user, i.e. the owner of the audio apparatus 1, inserts the same compact disc as that used to store the identification code A21 in the above-mentioned memory area M21 into the compact disc reproduction means 11 to reproduce the compact disc at step p5, whereby the judgment identification code C1, i.e TOC information, is read out.

At step p6, the judgment identification code C1 having been input at step p5 is compared with the identification code A21 previously stored in the memory area M21 to judge whether they have a predetermined identification judgment relationship, i.e. whether they are identical to each other, for example. In the case of the present embodiment, when it is judged that the judgment identification code C1 having been input at step p5 is identical to the identification code A21, the procedure advances to step p12, and the identification code A2 stored in the memory area M21 is deleted. The procedure then advances to step p13, and ordinary operation is carried out.

At the above-mentioned step p6, when it is judged that the judgment identification code C1 having been input at step p5 is not identical to the identification code A21 stored in the memory area M21, the procedure advances to step p7. At step p7, the number of inconsistencies between the judgment identification code C1 and the identification code A21 is counted. At step p8, a judgment is made to determine whether the inconsistencies are generated continuously predetermined number of times, N1. When the number of inconsistencies is less than N1, the procedure advances to step p9, and the indication means 10 carries out error indication. In this error indication, the indication means 10 indicates characters "ERR" together with the number of values counted at step p7 for a predetermined period of time, for example, 2 seconds. After step p9, the procedure returns to step p5.

When the number of errors is not less than the predetermined value N1 at step p8, data indicating the second inoperable state is set and written in the memory area M26 at step p10. This second inoperable state is canceled at step p11. The value N1 may be 5 or 10, for example.

Figure 7:
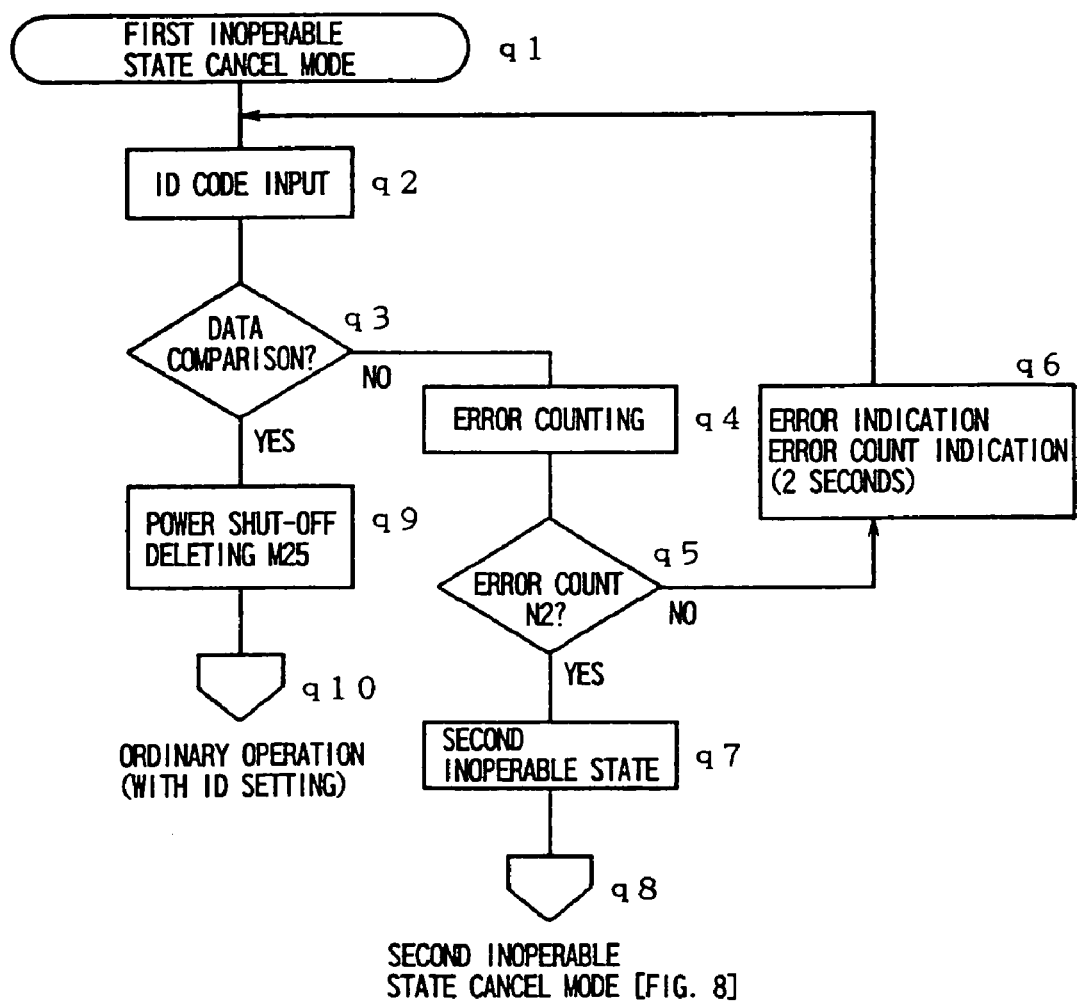
FIG. 7 is a flowchart illustrating the operation carried out by the processing circuit 5 in the first inoperable state cancel mode at step u7 of FIG. 3.

FIG. 7 is a flowchart illustrating the operation carried out by the processing circuit 5 in the first inoperable state cancel mode at step u7 of FIG. 3. The procedure advances from step q1 to step q2. Steps q2 to q8 of FIG. 7 are the same as steps p5 to p11 of FIG. 6. A judgment is made at step q3 to determine whether the judgment identification code C1 input at step q2 and the identification code A2 stored in the memory area M21 have an identification judgment relationship, for example, whether they are identical to each other. When not identical, the number of inconsistencies is counted at step q4. A judgment is made at step q5 to determine whether the count value is not less than the predetermined value N2. When the count value is less than N2, the procedure advances to step q6. At step q6, error indication is carried out, the count value is indicated for 2 seconds, and the procedure returns to step q2. When it is judged at step q5 that the count value is not less than the predetermined value N2, data indicating the second inoperable state is stored in the memory area M26 at step q7. The second inoperable state is canceled at step q8.

When it is judged at step q3 that the judgment identification code C1 is identical to the identification code A21, data indicating power shut-off, stored in the memory area M25, is deleted at the next step q9. The ordinary operation of the audio apparatus 1 is carried out at step q10. The value N2 at step q5 may be identical to the above-mentioned value N1, or may be 5 or 10.

Figure 8:
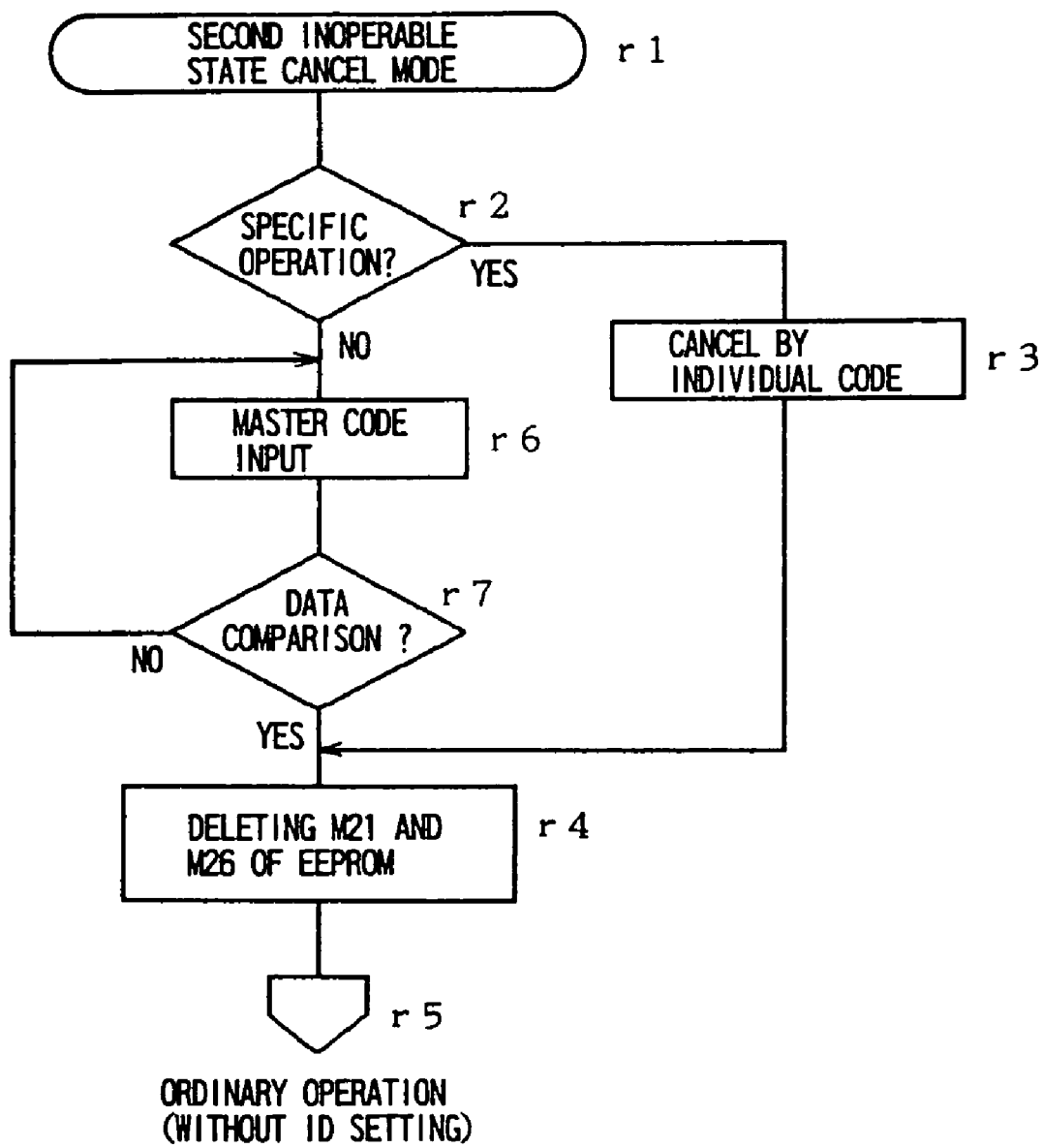
FIG. 8 is a flowchart illustrating the operation carried out by the processing circuit 5 in the second inoperable state cancel mode at step u8 of FIG. 3.

FIG. 8 is a flowchart illustrating the operation carried out by the processing circuit 5 in the second inoperable state cancel mode at step u8 of FIG. 3. The procedure advances from step r1 to step r2. A judgment is made to determine whether a predetermined specific operation is carried out by the input means 17. This specific operation is the simultaneous operation of the compact disc insertion/ejection switch and a switch for selecting a third song, for example. The specific operation may be switch operation not carried out ordinarily by the audio apparatus 1. When this kind of specific operation is carried out, the procedure advances to step r3 wherein the second inoperable state is canceled by using an individual code in accordance with the present invention. This step r3 will be described referring to FIG. 9.

Although the setting start operation at step s3 of FIG. 4, the cancel start operation at step p4 of FIG. 6, and the specific operation at step r2 of FIG. 8 may be different from each other as described above, they may be identical to each other.

When the above-mentioned specific operation is not carried out at step r2 of FIG. 8, the procedure advances to step r6, and a judgment is made to determine whether the master code A11 has been input. The master code is held by only the dealer secretly, recorded on the master compact disc and controlled so as not to be disclosed. This kind of master compact disc is inserted into the compact disc reproduction means 11, and the master code stored in its lead-in area is read for example. At step r7, a judgment is made to determine whether the master code having been read is identical to the master code A11 stored in the memory area M11 of the non-erasable memory 19. When identical, the identification code A21 stored in the memory area M21 of the memory 21 is deleted, and data indicating the second inoperable state stored in the memory area M26 is also deleted at step r4. As a result, the ordinary operation of the audio apparatus 1 can be carried out at step r5.

Figure 9:
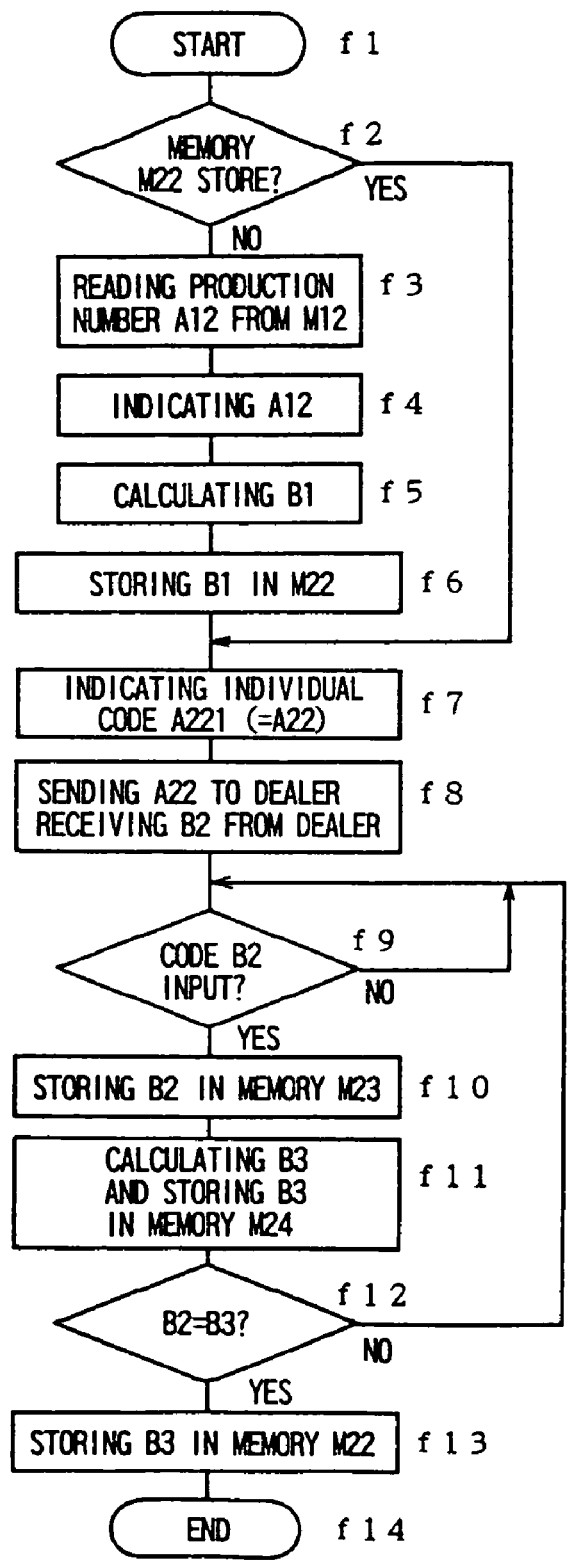
FIG. 9 is a flowchart illustrating the operation carried out by the processing circuit 5 to cancel the second inoperable state by using an individual code at step r3 of FIG. 8.

FIG. 9 is a flowchart illustrating the operation carried out by the processing circuit 5 to cancel the second inoperable state by using an individual code at step r3 of FIG. 8. The procedure advances from step f1 to step f2. At step f2, a judgment is made to determine whether an individual code A22 is stored in the memory area M22. This individual code A22 is a unique code individually assigned to the audio apparatus 1. When it is judged that the individual code A22 is not stored in the memory M22 at step f2, the production number A12 is read from the memory area M12 at step f3. At step f4, the production number A12 having been read is indicated by the indication means 10.

Figure 12:
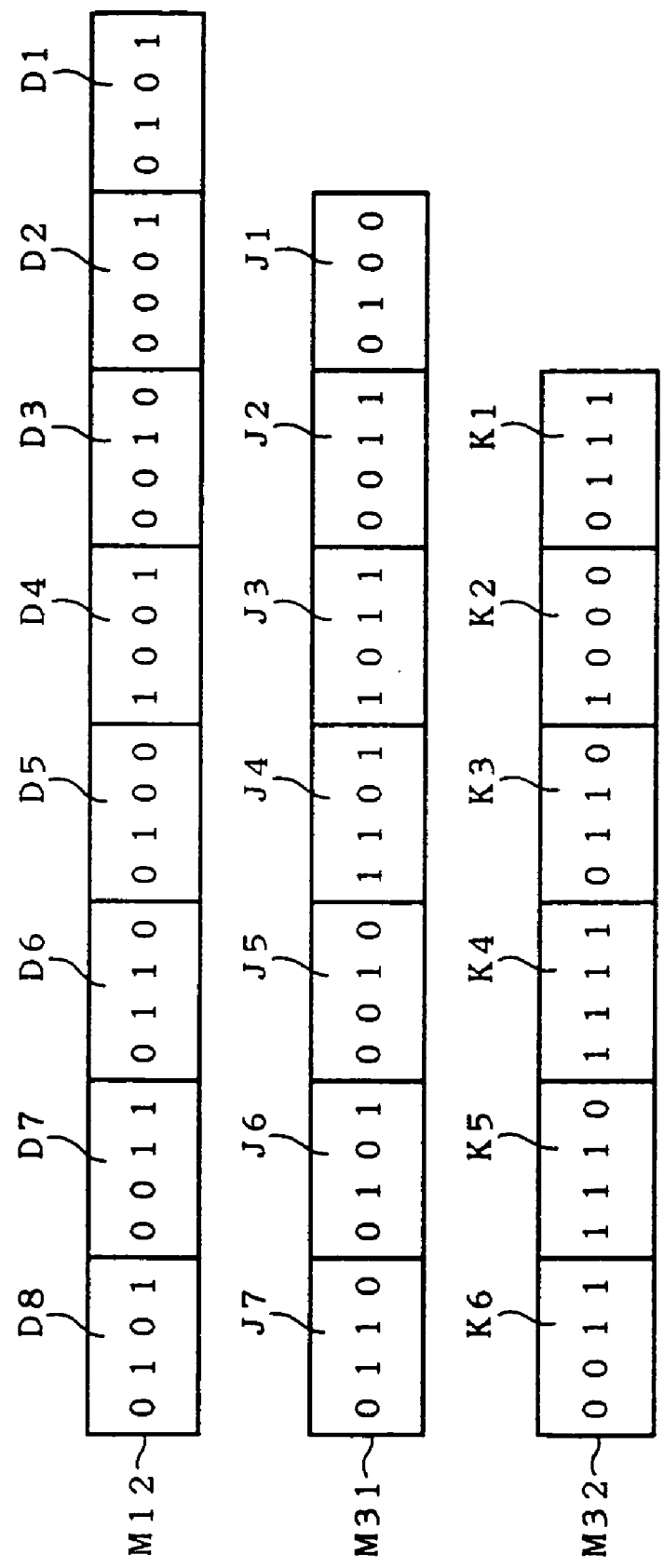
FIG. 12 is a view illustrating a predetermined calculation for the production number A12, executed at step f5 of FIG. 9 by the processing circuit 5.

At step f5, a predetermined calculation for the production number A12, described later referring to FIG. 12, is carried out by using the production number A12 having been read, and a calculation result B1 is obtained. Step f5 forms a production number calculating means. The production number may be input manually through the input means 17. The calculation result B1 is stored as the individual code A22 in the memory area M22 at step f6. The memory area M12 constitutes a production number memory. The memory area M22 constitutes an individual code memory.

At step f7, a value A221 having a predetermined first relationship with the individual code A22 stored in the memory area M22, such as a relationship of being equal, is indicated by the indication means 10.

At the step f2, when the individual code A22 is judged as being stored in the memory area M22, at step f7 is indicated the value A221 having the predetermined first relationship with the individual code A22 stored in the memory area M22, such as a relationship of being equal.

The user of the audio apparatus 1 recognizes the individual code A221 indicated by the indication means 10, makes a phone call to the dealer by using a telephone 27 so that the individual code A221 is notified to the dealer by voice. The dealer receives the individual code A221 as described later referring to FIGS. 10 and 11, and carries out calculation as described later referring to FIG. 13. In FIG. 9, the operation at step f8 is described for ease of understanding, although the operation is not carried out by the processing circuit 5. When the individual judgment code B2 calculated by the dealer is notified by the dealer to the user by voice by the telephone 27, the user inputs the individual judgment code B2 by using the input means 17.

When it is judged at step f9 that the individual judgment code B2 has been input by using the input means 17, the individual judgment code B2 having been input is stored in the memory area M23 at step f10.

At step f11, by using the individual code A22 stored in the memory area M22, a predetermined individual code calculation is carried out as described later referring to FIG. 13, and the calculation result B3 is obtained and stored in the memory area M24.

At step f12, a judgment is made to determine whether the individual judgment code B2 having been input and stored in the memory area M23 and the code B3 obtained by the calculation at step f11, stored in the memory area M24 and indicating the result of the calculation are identical to each other, that is, there is the predetermined second relationship between the individual code A22 stored in the memory area M22 and the individual judgment code B2 input and stored in the memory M23.

When the individual judgment code B2 is identical to the code B3 indicating the calculation result, at step f13 the code B3 indicating the coincident calculation result is read from the memory area M24 and transferred as the individual code A22 to the memory area M22 so as to be updated. When not identical at step f12, the procedure returns to step f9. After step f14, the procedure advances to the above-mentioned step r4 of FIG. 8.

Step f11 constitutes the individual code calculating means for carrying out the predetermined calculation of the individual code A22. Step f12 constitutes the individual code relationship judging means. Step f13 constitutes the means for writing and updating the individual code A22.

Figure 10:
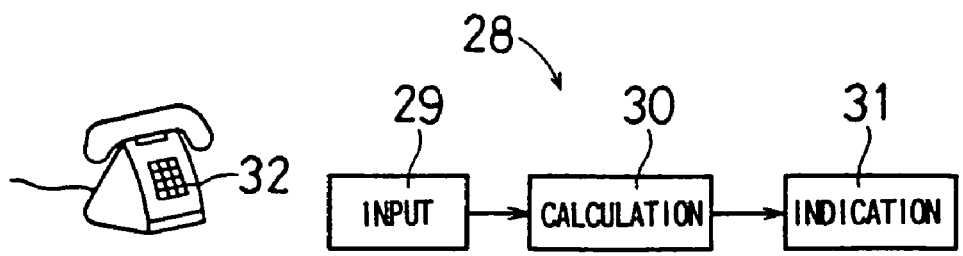
FIG. 10 is a block diagram showing the configuration of a dealer-use calculation device 28 provided for the dealer.

FIG. 10 is a block diagram showing the configuration of a dealer-use calculation device 28 provided for the dealer. The dealer has a telephone 32 for telephone communication with the user. In addition, an input means 29, such as a keyboard, is provided so that the dealer can input the individual code A221 known from the user by the telephone 32. The output of the input means 29 is supplied to a calculation circuit 30 embodied by a microcomputer or the like. The calculation circuit 30 carries out the predetermined calculation of the individual code A221 as described later referring to FIG. 13. The code B2 indicating the result of the calculation is indicated by the indication means 31.

Figure 13:
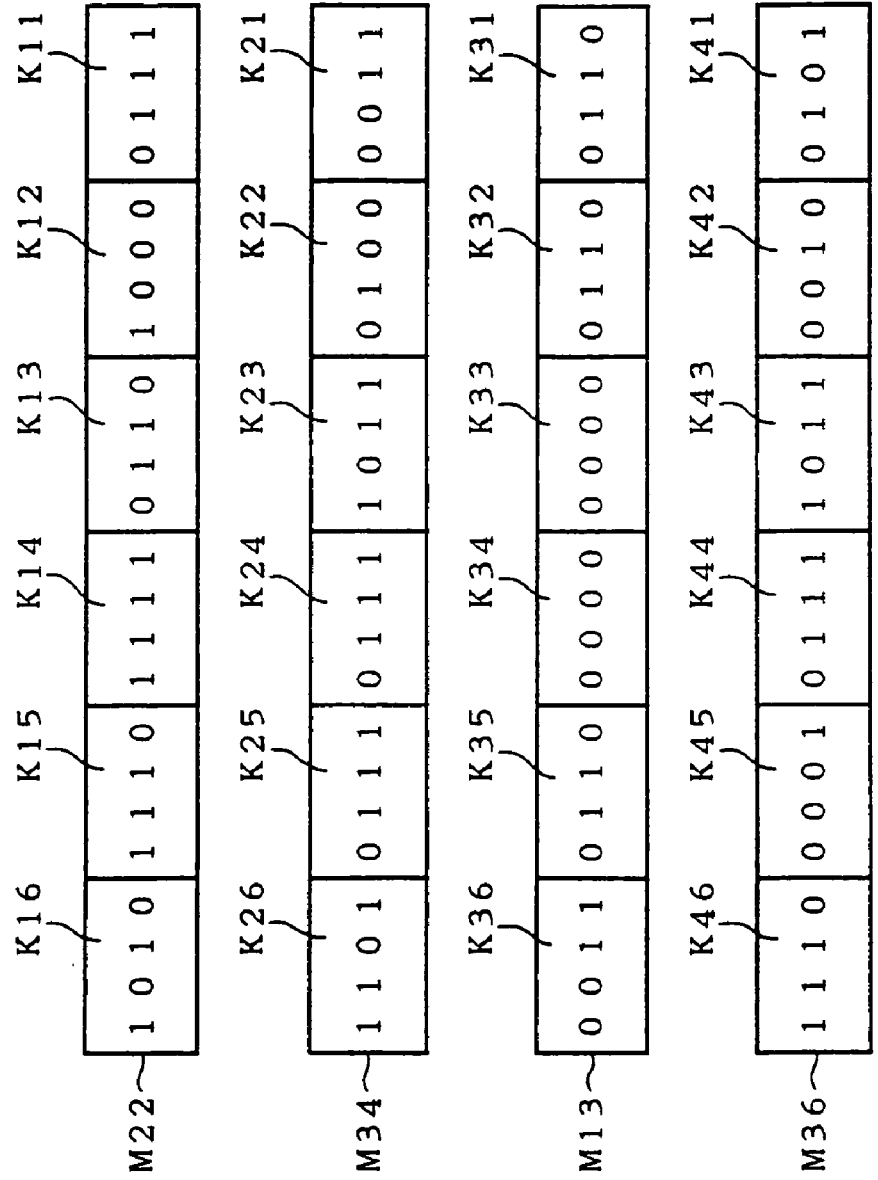
FIG. 13 is a view illustrating a predetermined calculation for the individual code A22, attained at step f11 of FIG. 9 by the processing circuit 5.

It can be said that the code B2 indicating the calculation result obtained by the calculation circuit 30 has a predetermined third relationship as shown in FIG. 13, for example, with the individual code A221 input by the input means, that is, the individual code A221 indicated by the indication means. The indication means 31 may have a configuration for performing visual indication or audio notification with a voice synthesis circuit, for example. This kind of dealer-use calculation device 28 can be embodied by a personal computer or the like.

Figure 11:
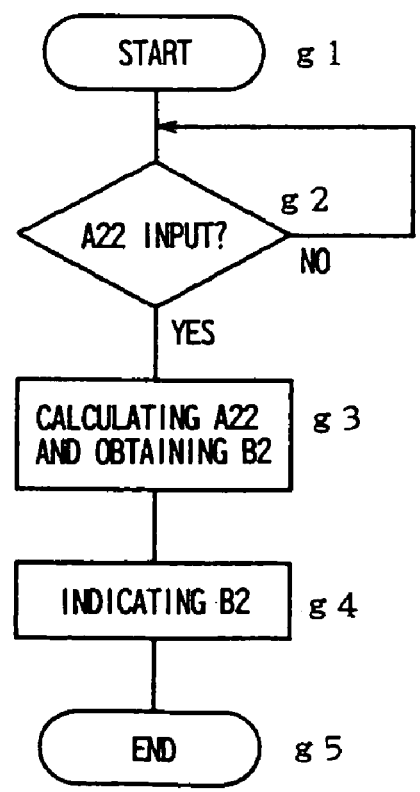
FIG. 11 is a flowchart illustrating the operation of the calculation circuit 30 of the dealer-use calculation device 28 shown in FIG. 10.

FIG. 11 is a flowchart illustrating the operation of the calculation circuit 30 of the dealer-use calculation device 28 shown in FIG. 10. The procedure advances from step g1 to step g2. When it is judged that the individual code A221 notified by the telephone 32 has been input through the input means 29, the individual code A221 having been input undergoes the calculation shown in FIG. 13, and the individual judgment code B2 is obtained at the next step g3. At step g4, the individual judgment code B2, the result of the calculation, is indicated by the indication means 31. In this way, a series of operations end at step g5. The individual judgment code B2 indicated by the indication means 31 is notified from the dealer to the user by the telephone 32.

FIG. 12 is a view illustrating a predetermined calculation for the production number A12, executed at step f5 of FIG. 9 mentioned above. The calculation shown in FIG. 12 is attained by the processing circuit 5. The memory area M12 has storage areas D1 to D8 for each storing each digit of a decimal number. The production number A12 is formed of plural decimal digits (8 digits in the case of the present embodiment). When the production number A12 is "53649215" for example, a binary number "0101" indicating 5, the value at the most significant digit of the decimal number, is stored at the most significant digit D8. A binary number "0011" indicating 3, the value at the second significant digit of the decimal number, is stored at the storage area D7.

The memory area M31 of the random access memory 18 has storage areas J1 to J7 for each storing a binary number comprising four digits. The number of digits, the storage areas J1 to J7, is less than that of the above-mentioned storage areas D1 to D8 by one. The processing circuit 5 carries out exclusive OR (EX-OR) for two digits adjacent to each other in the range of the digits D1 to D8 in the memory area M12. The results are written in the storage areas J1 to J7, respectively. For example, the binary numbers in the storage areas D8 and D7 are exclusively ORed at each binary digit, and the result of the calculation is stored in the storage area J7. In the case of the present embodiment, "0101" in the storage area D8 and "0011" in the storage area D7 are exclusively ORed at each binary digit, and a binary number "0110" is stored in the storage area J7. In the same way, "0011" in the storage area D7 and "0110" in the storage area D6 are exclusively ORed, and "0101" is stored in the storage area J6.

The contents of the memory area M31 holding the exclusive OR calculation results further undergo a second exclusive OR calculation for two digits adjacent to each other in the range of the storage areas J1 to J7, and the results are stored in the storage areas K1 to K6 of the memory area M32, respectively. For example, "0110" in the storage area J7 and "0101" in the storage area J6 are exclusively ORed at each binary digit, and the result, a binary number "0011," is stored in the storage area K6. In this way, two digits represented in binary and adjacent to each other of the decimal production number A12 are exclusively ORed sequentially two times in total as described above. As a result, the hexadecimal individual code B1 is obtained in the memory area M32. The content B1 of the memory area M32 obtained as described above is transferred to the memory area M22 of the memory 21 and then written. The memory areas M31 and M32 are embodied by the random access memory 18.

In the case of another embodiment of the present invention, when it is judged at the above-mentioned step f12 of FIG. 9 that a code B21 different from the correct individual judgment code B2 to be input by the input means 17 is input by mistake, it may be possible to calculate in accordance with a predetermined calculation method to obtain a new individual code A222 different from the individual code A22 calculated and obtained at step f6, and write this new individual code A222 in the memory area M22 to update, instead of executing the above-mentioned step f9 of FIG. 9. In this way, the individual code A22 stored in the memory area M22 is updated and a new individual code A222 is obtained, every time when a wrong code B21 different from the correct individual judgment code B2 is input through the input means 17.

The calculation method for such a new individual code A222 is, for example, to bring the bit "1" at the least significant digit of the binary value "0111" in the least significant storage area K1 of the memory area M32 shown in FIG. 12 to the position of the bit "0" at the most significant digit of the binary value "0011" in the most significant storage area K6, thereby circulating and shifting a bit at each binary digit in the storage areas K1 to K6 of the memory area M32 to the less significant bit side (the right side of FIG. 12) by one bit. As a result, the binary value in the most significant storage area K6 is "1001," the binary value in the storage area K5 is "1111," and finally the binary value in the least significant storage area K1 is "0011" after this calculation. Such a calculation of shifting and circulating to the less significant digit by one bit is executed every time when the above-mentioned second relationship, that is, the individual judgment relationship is not established because of a wrong code B21 input through the input means.

In the case of another embodiment of the present invention, to update the individual code A22:

(a) the individual code A22 stored in the memory area M22 is subjected to calculation in accordance with a predetermined logical equation to update, every time when the correct or wrong code B21 is input;

(b) calculation is executed in accordance with a preset table; or (c) a new individual code A222 may be obtained by another calculation method.

FIG. 13 is a view illustrating the predetermined calculation for the individual code A22 attained at step f11 of FIG. 9 by the processing circuit 5. This calculation is the same as the predetermined individual code calculation at step g3 of FIG. 11 by the calculation circuit 30 included in the dealer-use calculation device 28 shown in FIG. 10. This kind of calculation will be described below. In the processing circuit 5, the individual code A22 stored in the memory area M22 has a binary value at each of plural hexadecimal digits, 6 digits of K11 to K16, for example. This individual code A22 is read, and each binary digit of the above-mentioned digits K11 to K16 is shifted by one digit to the right of FIG. 13 to obtain the digits K21 to K26 of the memory area 34. The binary value ("1" for example) at the least significant digit of the last digit K11 is transferred and shifted to the most significant digit of the most significant digit K26 of the memory area M34.

As mentioned above, the fixed value A13 is stored in the memory area M13 of the memory 19. This fixed value A13 is a decimal value, "360066" for example. The number of binary digits of A13 is the same as that of the individual code A22, and the binary values of A13 are stored and set at digits K31 to K36.

By the processing circuit 5, the binary values at the digits K21 to K26 of the memory area M34 and the corresponding binary values at the digits K31 to K36 of the memory area M13 are exclusively ORed, respectively. The result values are stored at digits K41 to K46 of the memory area M36, respectively, the number of digits being the same as those of the memory areas M34 and M13 (six digits in the case of the present embodiment). The binary digits of the digit K26 and the corresponding binary digits of the digit K36 are exclusively ORed, respectively, for example, and the result values of the calculation are stored at the digit K46. The memory areas M34 and M36 are embodied by the random access memory 18. The obtained result of the calculation in the memory area M36 is written and stored as the code B3 in the memory area M24 of the memory 21.

The calculation operation of the processing circuit 5, shown in FIG. 13, can also be attained by the calculation circuit 30 of the dealer-use calculation device 28. The individual code A221 to be input through the input means 29 is the same as the content stored in the memory area M22 of FIG. 13.

In the case of the above-described embodiment, the individual code A22 stored in the memory area M22 and the output code A221 indicated by the indication means and supplied to the dealer by telephone, have a first relationship, where they are identical to each other. On the other hand, in the case of another embodiment of the present invention, the memory 21 shown in FIG. 1 is provided with the memory area M221. A predetermined calculation is executed by using the individual code A22 stored in the memory M22, and the output code A221 is obtained from the calculation result and stored in the memory area M221. Thus, the individual code A22 and the output code A221 have a first relationship, which is the above-mentioned predetermined calculation method using the individual code, and therefore, the value of the output code A221 is different from that of the individual code 22. The output code A221 stored in the memory area M221 is indicated and output by the indication means 10 at the above-mentioned step f7 of FIG. 9. The user recognizes the output code A221 indicated by the indication means 10 and notifies the code to the dealer by telephone. The dealer receives the output code A221 to execute calculation in accordance with the predetermined third relationship and obtain the individual judgment code B2. In the present invention, therefore, the value of the output code A221 may be the same as that of the individual code A22 in accordance with the predetermined first relationship as described in the embodiment shown by the figures, while the value of the output code A221 may be different from that of the individual code A22 as a result of a predetermined calculation using the individual code A22 in another embodiment.

A still another embodiment of the present invention will be described below. The predetermined first to third relationships in this embodiment are determined as follows. To calculate and obtain the output code A221 having a predetermined first relationship with the individual code A22, a calculation is executed such that each bit at the respective digits K11 to K16 of the individual code A22 stored in the memory M22 is shifted by one bit to the more significant side (i.e., the left direction in FIG. 13), and the most significant bit at the most significant digit K16 is transferred to the least significant bit at the least significant digit K11. In this way, the output code A221 having the predetermined first relationship with the individual code A22 is obtained.

To calculate and obtain the code B3 stored in the memory M24, which code B3 is to be compared with the individual judgment code B2 having a predetermined second relationship with the individual code A22, in the same way as shown in FIG. 13, a calculation is executed such that each bit at the respective digits K11 to K16 of the individual code A22 is shifted by one bit to the less significant side (i.e., the right direction in FIG. 13), and the least significant bit at the least significant digit K11 is transferred to the most significant bit at the most significant digit K16, and exclusive Or is executed by using a fixed value A13 as shown in FIG. 13. The calculation result, which is a content stored in the memory M36, is made to be the code B3.

The dealer-use calculation device 28 calculates to obtain the code B2 having a predetermined third relationship with the output code A221 input through the input means 29. In the calculation circuit 30, a calculation is executed such that the plural digits of the output code A221 are shifted by two bits to the less significant side (i.e., the right direction in FIG. 13) and the least significant bit at the least significant digit is transferred to the most significant bit at the most significant digit, and moreover, exclusive OR is executed by using a fixed value A13 as shown in FIG. 13. The calculation result stored in the memory area M36 is made to be the code B2 in the same way as described above.

In this way, the individual code A22 stored in the memory M22 is subjected to calculation in accordance with the predetermined first relationship to obtain the output code A221, and the output code A221 is subjected to calculation in accordance with the predetermined third relationship to obtain the code B2. This code B2 coincides with the individual judgment code B3 obtained by subjecting the individual code A22 to calculation in accordance with a predetermined second relationship.

In the case of the above-mentioned embodiment of the present invention shown by figures, the individual code A22 and the output code A221 have a first relationship, where they have identical values to each other, and the individual judgment code B2 and the individual code A22 have a second relationship, where they have different values from each other. However, in the case of a still another embodiment of the present invention, the output code A221 and the individual code A22 may have a first relationship, where they have values different from each other, and the individual judgment code B2 and the individual code A22 may have a second relationship, where they have values identical to each other.

In another embodiment of the present invention, AND, OR, or another logic operation may be performed instead of exclusive OR as shown in FIGS. 12 and 13.

The invention can be applied not only to the audio apparatus 1, but also to a wide variety of electronic apparatuses having other various configurations.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic apparatus having a security function, said apparatus comprising:
    theft judging means for judging whether said electronic apparatus has been exposed to theft;
    inoperable state setting means for, in response to an output of said theft judging means, putting said electronic apparatus into an inoperable state against theft in which a predetermined operation of a controlled circuit is disabled when said theft judging means judges that said electronic apparatus has been exposed to theft;
    a nonvolatile individual code memory for storing an individual code individually assigned to said electronic apparatus;
    output means for outputting the individual code to a dealer-use calculation device external to said electronic apparatus;
    input means for inputting an individual judgment code which is obtained out of the individual code by being calculated based on a predetermined third relationship, which is common to all electronic apparatuses serviced by the dealer-use calculation device, the individual judgment code being effective only for said electronic apparatus and being received from the dealer-use calculation device;
    individual code relationship judging means for judging whether the individual judgment code inputted by said input means and the individual code have a predetermined second relationship; and
    inoperable state canceling means for canceling the inoperable state against theft when said individual code relationship judging means judges that the individual judgment code and the individual code have the predetermined second relationship.

2. The electronic apparatus having a security function of claim 1, wherein said individual code relationship judging means calculates an intermediate code having a predetermined fourth relationship with the individual code, and judges whether or not the individual judgment code and the individual code have the predetermined second relationship based on a comparison between the individual judgment code and the intermediate code.

3. The electronic apparatus having a security function of claim 1, wherein the individual code is a production number of said electronic apparatus.

4. The electronic apparatus having a security function of claim 1, further comprising:
    a nonvolatile unique memory for storing data which is unique to said electronic apparatus; and
    calculating means for carrying out a predetermined calculation by using the unique data stored in said unique memory, and storing the calculation result in said individual code memory as the individual code.

5. The electronic apparatus having a security function of claim 4, wherein the data which is unique to said electronic apparatus is a production number of said electronic apparatus.

6. The electronic apparatus having a security function of claim 1, wherein, in response to the input of the individual judgment code by said input means, the individual code is updated by a predetermined calculation.

7. The electronic apparatus having a security function of claim 1, further comprising:

a nonvolatile identification code memory for storing an identification code of the controlled circuit; and an identification code input means for inputting a judgment identification code of the controlled circuit;

wherein when the identification code previously stored in said nonvolatile identification code memory and the judgment identification code inputted by said identification code input means have a predetermined judgment identification relationship, the predetermined operation of the controlled circuit is enabled, and when the identification code stored in said identification code memory and the judgment identification code inputted by said identification code input means do not have the predetermined judgment identification relationship, said electronic apparatus is put into an inoperable state for confirmation in which the predetermined operation of the controlled circuit is disabled;

wherein when a predetermined condition relating to the input operation of said identification code input means is established, said theft judging means judges that said electronic apparatus has been exposed to theft; and wherein said inoperable state setting means does not enable the predetermined operation of the controlled circuit after said theft judging means judges that said electronic apparatus has been exposed to theft, regardless of the judgment identification code inputted by said identification code input means.

8. The electronic apparatus having a security function of claim 1, wherein the controlled circuit is an audio apparatus mounted on a vehicle.

9. The electronic apparatus having a security function of claim 1, wherein said individual judging means calculates an intermediate code having a predetermined fifth relationship with the individual judgment code, and judges whether the individual judgment code and the individual code have the predetermined second relationship based on the comparison between the individual code and the intermediate code.

10. A method of canceling an inoperable state of an electronic apparatus having a security function, said method comprising:

providing an electronic apparatus having a security function, the electronic apparatus comprising:

theft judging means for judging whether the apparatus has been exposed to theft, inoperable state setting means for, in response to an output of the theft judging means, putting the electronic apparatus into an inoperable state against theft in which a predetermined operation of a controlled circuit is disabled when the theft judging means judges that the electronic apparatus has been exposed to theft, a nonvolatile individual code memory for storing an individual code individually assigned to the electronic apparatus, output means for outputting the individual code, input means for inputting an individual judgment code, individual code relationship judging means for judging whether the individual judgment code inputted by the input means and the individual code have a predetermined second relationship, and inoperable state canceling means for canceling the inoperable state against theft of the controlled circuit when the individual code relationship judging means judges that the individual judgment code and the individual code have the predetermined second relationship, the individual judgment code and the individual code having the predetermined second relationship when the individual code and the individual judgment code have a predetermined third relationship;

providing a dealer-use calculation device comprising deriving means for deriving the individual judgment code having the predetermined third relationship with the individual code out of the individual code, the dealer-use calculation device being external to the electronic apparatus having a security function;

supplying the individual code outputted from the output means of the electronic apparatus having a security function to the dealer-use calculation device; and inputting the individual judgment code derived in the dealer-use calculation device and having the predetermined third relationship with the individual code to the input means of the electronic apparatus having a security functions wherein:

the third relationship is common to all electronic apparatuses serviced by the dealer-use calculation device; and the individual judgment code is effective only for the electronic apparatus having a security function.

11. The method of canceling the inoperable state of an electronic apparatus having a security function of claim 10, further comprising:

providing a nonvolatile identification code memory for storing an identification code of the controlled circuit; and providing an identification code input means for inputting a judgment identification code of the controlled circuit;

wherein, in the electronic apparatus having a security function, when the identification code previously stored in the nonvolatile identification code memory and the judgment identification code inputted by the identification code input means have a predetermined judgment identification relationship, a predetermined operation of the controlled circuit is enabled, and when the identification code stored in the identification code memory and the judgment identification code inputted by the identification code input means do not have the judgment identification relationship, the electronic apparatus is put into an inoperable state for confirmation in which the predetermined operation of the controlled circuit is disabled;

wherein when a predetermined condition relating to the input operation of the identification code input means is established, the theft judging means judges that the electronic apparatus has been exposed to theft; and wherein the inoperable state setting means does not enable the predetermined operation of the controlled circuit after the theft judging means judges that the electronic apparatus has been exposed to theft, regardless of the identification code inputted by the identification code input means.

12. A method of canceling an inoperable state of an electronic apparatus having a security function, said method comprising:

judging whether the apparatus has been exposed to theft, putting the electronic apparatus into an inoperable state against theft in which a predetermined operation of a controlled circuit is disabled when said judging whether the apparatus has been exposed to theft judges that the electronic apparatus has been exposed to theft;

storing an individual code individually assigned to the electronic apparatus;

outputting the individual code;

inputting an individual judgment code which is effective only for the electronic apparatus;

judging whether the individual judgment code inputted in said inputting of the individual judgment code and the individual code have a predetermined second relationship;

canceling the inoperable state against theft of the controlled circuit when said judging whether the inputted individual judgment code and the individual code judges that the individual judgment code and the individual code have the predetermined second relationship, the individual judgment code and the individual code having the predetermined second relationship when the individual code and the individual judgment code have a predetermined third relationship;

deriving, in a dealer-use calculation device external to the electronic apparatus, the individual judgment code having the predetermined third relationship with the individual code out of the individual code, the third relationship being common to all electronic apparatuses serviced by the dealer-use calculation device;

supplying the individual code outputted in said outputting of the individual code to the dealer-use calculation device; and inputting the individual judgment code derived in said deriving of the individual judgment code and having the predetermined third relationship with the individual code to the electronic apparatus having a security function.

13. The method of canceling the inoperable state of an electronic apparatus having a security function of claim 12, further comprising:

storing an identification code of the controlled circuit;

inputting a judgment identification code of the controlled circuit; and judging, in the electronic apparatus having a security function, whether the identification code stored in said storing of the identification code and the judgment identification code inputted in said inputting of the judgment identification code have a predetermined judgment identification relationship; wherein:

when said judging whether the stored identification code and the inputted judgment identification code have the predetermined relationship judges that the stored identification code stored and the inputted judgment identification code have the predetermined judgment identification relationship, a predetermined operation of the controlled circuit is enabled;

when said judging whether the stored identification code and the inputted judgment identification code have the predetermined relationship judges that the stored identification code stored and the inputted judgment identification code do not have the predetermined judgment identification relationship, the electronic apparatus is put into an inoperable state for confirmation in which the predetermined operation of the controlled circuit is disabled;

when a predetermined condition relating to said inputting of the judgment identification code is established, said judging whether the electronic apparatus has been exposed to theft judges that the electronic apparatus judges that the electronic apparatus has been exposed to theft; and said putting of the electronic apparatus into the inoperable state against theft does not enable the predetermined operation of the controlled circuit after said judging whether the electronic apparatus has been exposed to theft judges that the electronic apparatus has been exposed to theft, regardless of the identification code inputted in said inputting of the judgment identification code.

* * * * *